United States Patent
Blessman et al.

(10) Patent No.: US 9,582,834 B2
(45) Date of Patent: *Feb. 28, 2017

(54) SURVEILLANCE AND POSITIONING SYSTEM

(71) Applicant: B3, LLC, Denver, CO (US)

(72) Inventors: Paul Bradford Blessman, Denver, CO (US); Robert Colton Biedenbach, Parker, CO (US)

(73) Assignee: B3, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,053

(22) Filed: Oct. 4, 2016

(65) Prior Publication Data

US 2017/0024826 A1    Jan. 26, 2017

Related U.S. Application Data

(63) Continuation of application No. 15/146,086, filed on May 4, 2016, now Pat. No. 9,483,796, which is a
(Continued)

(51) Int. Cl.
*G06Q 40/08*    (2012.01)
*H04N 7/18*    (2006.01)

(52) U.S. Cl.
CPC .............. *G06Q 40/08* (2013.01); *H04N 7/183* (2013.01)

(58) Field of Classification Search
CPC ................................ G06Q 40/08; H04N 7/181
See application file for complete search history.

(56) References Cited

U.S. PATENT DOCUMENTS 4,491,725 A    1/1985 Pritchard
5,544,044 A    8/1996 Leatherman
(Continued)

FOREIGN PATENT DOCUMENTS

EP          2461286       6/2012
WO    WO 2004/059420    7/2004
(Continued)

OTHER PUBLICATIONS

"2011 Kansas Estimated Storm Losses," Kansas Insurance Department, 1 page [retrieved from www.kinsurance.org/storms/year.php?year=2011 on Jan. 18, 2012].
(Continued)

*Primary Examiner* — Rajesh Khattar
(74) *Attorney, Agent, or Firm* — Sheridan Ross P.C.

(57) ABSTRACT

A position determining system includes a surveillance and monitoring special purpose computer, one or more sensors in electrical communication with the surveillance and monitoring special purpose computer, one or more surveillance cameras in electrical communication with the surveillance and monitoring special purpose computer, the surveillance and monitoring special purpose computer receiving from the one or more sensors positional data about an asset and assembling and forwarding instructions to the one or more surveillance cameras in electrical communication with the surveillance and monitoring special purpose computer, the instructions requesting specific surveillance to be undertaken by the one or more surveillance cameras; and a processor in electrical communication with the surveillance and monitoring special purpose computer that determines if additional data is required about the asset and when additional data is required, assembling and forwarding instructions regarding an action.

20 Claims, 7 Drawing Sheets

Related U.S. Application Data continuation of application No. 13/776,208, filed on Feb. 25, 2013, now abandoned.

(60) Provisional application No. 61/602,893, filed on Feb. 24, 2012.

(56) References Cited

U.S. PATENT DOCUMENTS

| | | |
|---|---|---|
| 5,778,345 A | 7/1998 | McCartney |
| 5,950,169 A | 9/1999 | Borghesi et al. |
| 5,987,423 A | 11/1999 | Arnold et al. |
| 6,345,258 B1 | 2/2002 | Pickens |
| 6,937,147 B2 | 8/2005 | Dilbeck et al. |
| 7,280,920 B1 | 10/2007 | Whiteside et al. |
| 7,315,842 B1 | 1/2008 | Wang |
| 7,330,821 B2 | 2/2008 | Wares |
| 7,353,115 B2 | 4/2008 | Bertogg et al. |
| 7,359,799 B2 | 4/2008 | Bresch et al. |
| 7,395,157 B2 | 7/2008 | Feyen et al. |
| 7,418,400 B1 | 8/2008 | Lorenz |
| 7,610,210 B2 | 10/2009 | Helitzer et al. |
| 7,693,728 B2 | 4/2010 | Underwood et al. |
| 7,693,731 B1 | 4/2010 | Weber et al. |
| 7,707,050 B2 | 4/2010 | Chen et al. |
| 7,711,584 B2 | 5/2010 | Helitzer et al. |
| 7,805,390 B2 | 9/2010 | Friedlander et al. |
| 7,844,528 B2 | 11/2010 | Ziade et al. |
| 7,849,002 B2 | 12/2010 | Gaubatz et al. |
| 7,860,734 B2 | 12/2010 | Solanki et al. |
| 7,899,739 B2 | 3/2011 | Allin et al. |
| 7,936,257 B2 | 5/2011 | Stahel et al. |
| 8,036,915 B2 | 10/2011 | Kremer et al. |
| 8,204,879 B2 | 6/2012 | Doyle |
| 8,219,425 B2 | 7/2012 | Thomas et al. |
| 8,229,772 B2 | 7/2012 | Tran et al. |
| 8,234,192 B2 | 7/2012 | Weber |
| 8,271,303 B2 | 9/2012 | Helitzer et al. |
| 8,290,794 B2 | 10/2012 | Delavy et al. |
| 8,380,546 B2 | 2/2013 | Rabson et al. |
| 9,317,983 B2 | 4/2016 | Ricci |
| 9,483,796 B1 | 11/2016 | Blessman et al. |
| 2002/0046066 A1 | 4/2002 | Laurenzano |
| 2002/0082874 A1 | 6/2002 | Go |
| 2003/0018497 A1 | 1/2003 | Luedtke |
| 2003/0028404 A1 | 2/2003 | Herron et al. |
| 2003/0216938 A1 | 11/2003 | Shour |
| 2003/0233261 A1 | 12/2003 | Kawahara et al. |
| 2004/0064345 A1 | 4/2004 | Ajamian et al. |
| 2004/0186753 A1 | 9/2004 | Kim et al. |
| 2005/0234813 A1 | 10/2005 | West et al. |
| 2005/0261930 A1 | 11/2005 | Litz |
| 2006/0015475 A1 | 1/2006 | Birkner et al. |
| 2006/0149571 A1 | 7/2006 | Birch et al. |
| 2006/0218014 A1 | 9/2006 | Walker et al. |
| 2007/0005412 A1 | 1/2007 | Martinez et al. |
| 2007/0179881 A1 | 8/2007 | Lord |
| 2008/0103841 A1 | 5/2008 | Lewis et al. |
| 2008/0154652 A1 | 6/2008 | Bresch et al. |
| 2008/0243917 A1 | 10/2008 | Schneider et al. |
| 2008/0262883 A1 | 10/2008 | Weiss et al. |
| 2008/0300924 A1 | 12/2008 | Savage et al. |
| 2009/0006137 A1 | 1/2009 | Wait et al. |
| 2009/0006138 A1 | 1/2009 | Wait et al. |
| 2009/0006139 A1 | 1/2009 | Wait et al. |
| 2009/0006140 A1 | 1/2009 | Wait et al. |
| 2009/0030910 A1 | 1/2009 | Bennett et al. |
| 2009/0048899 A1 | 2/2009 | Bender |
| 2009/0119132 A1 | 5/2009 | Bolano et al. |
| 2009/0265193 A1 | 10/2009 | Collins et al. |
| 2009/0281841 A1 | 11/2009 | Basak et al. |
| 2009/0287509 A1 | 11/2009 | Basak et al. |
| 2010/0045451 A1 | 2/2010 | Periwal |
| 2010/0131304 A1 | 5/2010 | Collopy et al. |
| 2010/0173582 A1 | 7/2010 | Han |
| 2010/0262436 A1 | 10/2010 | Chen et al. |
| 2011/0016024 A1 | 1/2011 | Bennardo |
| 2011/0137685 A1 | 6/2011 | Tracy et al. |
| 2011/0213628 A1 | 9/2011 | Peak et al. |
| 2011/0218828 A1 | 9/2011 | Mathai et al. |
| 2012/0062392 A1 | 3/2012 | Ferrick et al. |
| 2012/0072244 A1 | 3/2012 | Collins et al. |
| 2012/0123806 A1 | 5/2012 | Schumann et al. |
| 2012/0271658 A1 | 10/2012 | Sloan, III |
| 2012/0296676 A1 | 11/2012 | Burgoon, Jr. et al. |
| 2013/0226624 A1 | 8/2013 | Blessman et al. |
| 2014/0306826 A1 | 10/2014 | Ricci |
| 2016/0071219 A1 | 3/2016 | Joshi et al. |
| 2016/0072891 A1 | 3/2016 | Joshi et al. |

FOREIGN PATENT DOCUMENTS

| | | |
|---|---|---|
| WO | WO 2004/068298 | 8/2004 |
| WO | WO 2010/091372 | 8/2010 |
| WO | WO 2011/088891 | 7/2011 |

OTHER PUBLICATIONS

"Hurricane Katrina Insurance Facts," Insurance Providers, 2012, 7 pages, [retrieved from web.archive.org/web/20120531093700/http://www.insuranceproviders.com/hurricane-katrina-insurance-facts/].

"Hurricane Katrina: Analysis of the Impact on the Insurance Industry," Towers Perrin, Oct. 2005, 35 pages.

"Reinsurance and Financial Stability," International Association of Insurance Supervisors, Jul. 2012, 52 pages.

Ameredes "The U.S. Healthcare System," B2B Knowledge Source Inc., Nov. 2008, Version 2.0, 31 pages.

Boyle "Aon Benfield 2011 Catastrophe Study: $107 Bn Insured Losses; $435 Bn Economic," Insurance Journal, Jan. 10, 2012, 2 pages.

Holm "Hurricane Irene's Insured-Loss Tally: $5.5 Billion," The Wall Street Journal, Sep. 13, 2011, 1 page.

Marc "State Farm joins other major insurers in reporting significant spring storm losses," Insurance News Report, Jun. 21, 2011, 2 pages [retrieved from www.liveinsurancenews.com/state-farm-joins-other-major-insurers-in-reporting-significant-spring-storm-losses/].

Mutchler et al. "Construction Mangaement," Excerpt from The Architects's Handbook of Professional Practice, 13th edition, Aug. 2001, John Wiley & Sons, Inc., 9 pages.

Smolka "Natural disasters and the challenge of extreme events: risk management from an insurance persepective," Philosohical Transactions of The Royal Society A, Jun. 2006, vol. 364, pp. 2147-2165.

Zimmerli "Natural catastrophes and reinsurance," Swiss Reinsurance Company, 2003, 48 pages.

International Search Report and Written Opinion for International (PCT) Patent Application No. PCT/US2013/027575, mailed May 3, 2013 10 pages.

International Search Report on Patentability for International (PCT) Patent Application No. PCT/US2013/027575, mailed Sep. 4, 2014, 9 pages.

Office Action for U.S. Appl. No. 13/776,208, mailed Jun. 20, 2013 45 pages.

Office Action for U.S. Appl. No. 13/776,208, mailed Nov. 21, 2013, 53 pages.

Office Action for U.S. Appl. No. 13/776,208, mailed May 5, 2014, 50 pages.

Office Action for U.S. Appl. No. 13/776,208, mailed Dec. 2, 2014 76 pages.

Office Action for U.S. Appl. No. 13/776,208, mailed Mar. 12, 2015, 11 pages.

Office Action for U.S. Appl. No. 13/776,208, mailed Apr. 20, 2015, 10 pages.

Office Action for U.S. Appl. No. 13/776,208, mailed Dec. 4, 2015, 12 pages.

Office Action for U.S. Appl. No. 15/146,086, mailed Jul. 21, 2016, 8 pages.

Notice of Allowance for U.S. Appl. No. 15/146,086, mailed Sep. 23, 2016, 10 pages.

SURVEILLANCE AND POSITIONING SYSTEM

CROSS-REFERENCE TO RELATED APPLICATIONS

This application is a continuation of U.S. patent application Ser. No. 15/146,086, filed May 4, 2016, which is a continuation of U.S. patent application Ser. No. 13/776,208, filed on Feb. 25, 2013, which claims the benefit of U.S. Provisional Patent Application No. 61/602,893, filed on Feb. 24, 2012, the entire contents of which are incorporated herein by reference in its entirety for all purposes.

FIELD OF THE INVENTION

Aspects are directed toward a position determining system that includes a surveillance and monitoring special purpose computer; one or more sensors in electrical communication with the surveillance and monitoring special purpose computer; one or more surveillance cameras in electrical communication with the surveillance and monitoring special purpose computer, the surveillance and monitoring special purpose computer receiving from the one or more sensors positional data about an asset and assembling and forwarding instructions to the one or more surveillance cameras in electrical communication with the surveillance and monitoring special purpose computer, the instructions requesting specific surveillance to be undertaken by the one or more surveillance cameras; and a processor in electrical communication with the surveillance and monitoring special purpose computer that determines if additional data is required about the asset and when additional data is required, assembling and forwarding instructions regarding an action.

BACKGROUND OF THE INVENTION

The management of events and actors involved in insurance loss are traditionally handled through disparate, inefficient client-burdened systems with misaligned interests. The processes employed are commonly passive and operate after peril has occurred. Further, typical outcomes create dissatisfaction among the participants, in particular the insured policyholder, and routinely breed opportunities for insurance fraud. A need exists for a fundamental paradigm change in the management of insurance loss that aligns stakeholder interests, removes or reduces the role of the insured policyholder as the manager of the insurance loss process, and enables efficiencies that reduce costs and fraud.

Most insurance policyholders have fairly cynical viewpoints with respect to how benevolent their insurance companies and insurance agents are with respect to the customer's true desire to remain protected in the event of a catastrophe. Thus, it is unprecedented for insurance agents to proactively contact policyholders to warn them of impending physical events that may cause damage to items that are covered or otherwise encompassed under an insured's policy. Most communications between a policyholder and an insurance agent and company are limited to the initial contacts, where there is great incentive on the part of the insurance company to sign up a new policyholder, and then less cordial communications around events where policyholders make claims against their policy and thereafter have oftentimes adversarial dialogue and discussions with the insurance company and the agent with respect to whether a particular event is covered under policy language. Indeed, an entire insurance defense industry has been established and a great body of judicial precedent has been handed down over the decades to deal with how insurance policies are fairly interpreted when such disputes arise. Furthermore, oftentimes communications between a policyholder and an insurance agent can themselves be used as a basis for "bad faith" insurance claims, wherein a policyholder accuses the insurance agent and/or insurance company of unreasonably refusing to cover events, with the insurance company arguing that particular contractual language exists to preclude coverage. In brief, the history of insurance companies interactions with their insured's, while starting initially as mutually beneficial, often devolve into communications that are outright adversarial, costing both the insured and the insurance companies considerable time, effort, money and good will, in order to resolve disputes with respect to coverage issues.

There is also a lack of a comprehensive solution to address appropriate and commercially reasonable responses to peril between all stakeholders. The interaction between insurance agents and a policyholder is only one aspect of the overall process. To spread risk of loss, insurance agencies work with re-insurers. Simply stated, reinsurance is insurance for insurers. Just as individuals buy insurance in case of peril and for loss they do not wish to bear, insurers purchase reinsurance for risks they do not want to fully retain. Like insurers, re-insurers use the same techniques and models for risk selection. Also like insurers, re-insurers are often pre-funded through premium payments and pursue similar general approaches to asset liability management. Since insurers and re-insurers have similar business models, their interests are often aligned. For example, re-insurers have a central interest in understanding the risk of the insurance companies in order to accurately price and manage risks covered by a re-insurance policy. Re-insurers may require insurance companies to share certain information, such as information in the insurer's underwriting portfolio. Re-insurers may also share their knowledge of risk information, which can extend over a wide range of hazards and geographies to help with risk management.

U.S. Pat. Pub. No. 2009/0006139 published to Wait et al. ("Wait") provides a general overview of traditional insurance claim processing. Wait's methods for processing claims create a claim management case for an insured in response to a notice of a claim. One or more insurance policies covering the insured are associated with the claim management case. A process is performed at a claim management case level to fulfill an information requirement that applies to at least two of the insurance policies associated with the claim management case. Claims are adjudicated under the one or more of the insurance policies covering the insured. Typical of traditional insurance claim processing, the claim processing is performed after an event, and the client policy holder is required to actively involve himself in the claim process management. Wait is incorporated by reference in its entirety.

U.S. Pat. Pub. No. 2011/0137685 published to Tracy et al. on Jun. 9, 2011 ("Tracy") provides a typical approach to insurance loss management, albeit with computer-automated components. Tracy discloses a system centered around the customer (see Prior Art Figure) particularly applied to inland marine insurance. The Tracy system includes a loss mitigation computer system with a customer interface electronically receiving customer information data from a customer computer system via a communications network. A risk assessment computer processing module processes the customer information data and identifies a peril associated with the customer information data. A risk mitigation computer processing module generates a risk mitigation option based on the peril and receives customer selected risk mitigation options responsive to the generated risk mitigation option from the customer computer system. Further, a customization computer processing module generates a calculated insurance premium, a current risk assessment, a future risk assessment, recommendations, and a gap analysis based on the customer selected risk mitigation option. In Tracy, the insured policy holder essentially serves as the general manager of the insurance loss system. Tracy does not provide proactive or real-time management of insurance loss minimization. Tracy is incorporated by reference in its entirety.

U.S. Pat. Pub. No. 2011/0213628 published to Peak et al. on Sep. 1, 2011 ("Peak") provides some real-time management of insurance loss as related to vehicle losses. Peak provides detailed information to a policyholder about geographical areas which pose a high risk of loss, thereby allowing users to proactively avoid those areas. The accuracy of the information is improved by allowing mobile device users to provide updates about losses and related information while they are at or near an area at which a loss was suffered. Such updates may be used to initiate and process insurance claims associated with a loss. The information may also be used, pursuant to some embodiments, to price and underwrite certain policies, providing improved coverage and pricing for individuals based on their usage and driving patterns. Peak provides no comprehensive real-time solution for the management and minimization of insurance loss. Peak is incorporated by reference in its entirety.

Some effort has been made by the insurance industry to apply principles and/or elements of so-called "customer communications management (CCM)" to, for example, improve the effectiveness of the interactions between policyholders and insurance representatives. A common challenge with implementing CCM has been to apply it only within limited units or functional areas of a business (e.g. solely in marketing, distribution or claims) rather than comprehensively across all areas of an insurance business enterprise. As such, resulting improvements have been limited. For more background on CCM, see, for example, U.S. Pat. Pub. No. 2006/0149571 published to Birch et al. on Jul. 6, 2006 ("Birch"). Birch discloses systems, methods, and computer programs for unifying management of customer messages and responses in an enterprise across a plurality of channels. One embodiment is an enterprise system comprising: a plurality of enterprise applications for interacting with customers via a plurality of channels, and a communication management framework for managing messages to be presented to the customers and customer responses to the messages across the plurality of enterprise applications. Birch is incorporated by reference in its entirety.

Thus, the prior art does not provide a comprehensive management and minimization of insurance loss system in which insurance perils and insured assets are monitored, potential perils to insured assets are assessed, possible actions are determined, and selected actions are executed involving actors such as the policyholder, insurance agent, mitigation responder, and insurance appraiser. The prior art does not align stakeholder interests, remove or reduce the role of the insured policyholder as the manager of the insurance loss process, and enable efficiencies that reduce costs and fraud. Further, the prior art does not address damage mitigation during peril, and incident management after peril, to the policyholder and/or insured assets. Other similar problems can be found not only in other insurance industry fields, e.g. health care, etc., but are also present in other industries, such as the construction industry. The long felt but unsolved needs in these diverse industries is met via implementation of the various embodiments of the invention as set forth herein, addressing in particular the two principal areas of damage/loss mitigation and how best to address post damage/loss management in a fashion that is efficient, cost effective, employs recent advances in technology at the consumer level, and that provides the tremendous financial savings for the insurance and other industries that may employ the present invention. The system and method of the current invention described below addresses these deficiencies and problems.

SUMMARY OF THE INVENTION

Certain embodiments of the present invention are generally related to a system and method for comprehensive management and minimization of insurance loss. Insurance perils and insured assets are monitored, potential perils to insured assets are assessed, possible actions are determined, and selected actions are executed involving actors such as the policyholder, insurance agent, mitigation responder, and insurance appraiser. Particular embodiments address damage mitigation during peril and incident management after peril, to the policyholder and/or insured assets.

As used in this disclosure, the terms "system", "device" and "method" all refer to one or more embodiments of the invention. The terms "insured", "policy holder" and "insured policy holder" all refer to the insured policy holder. The terms "agent" and "insurance agent" all refer to the insurance agent. The term "insurer" and "cedant" refer to an insurance company that issues insurance policies to an insured policy holder. The term "re-insurer" refers to a company that provides a policy agreement to an insurer or cedant to cover certain losses suffered by the insurer or cedant due to paying an insured policy holder based on the policy coverage. The term "re-insurance" or "re-insurance policy" refer to the policy agreement between an insurer or cedant for the re-insurer.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "screen," "touch screen," or "touchscreen" refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. Thus, in embodiments, the screen can enable the user to interact with the device by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "display" refers to a portion of one or more screens used to display the output of a computer to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "covered location" means a location in which a majority of the projected surface area below the covering is contained or covered. For example, a garage would be a covered location that covers a majority of the area below the roof of the garage.

By way of providing additional background, context, and to further satisfy the written description requirements of 35 U.S.C. §112, the following references are incorporated by reference in their entireties for the express purpose of explaining the nature of the insurance processes and methods to further describe the various systems, sub-systems, tools and components commonly associated therewith: U.S. Pat. Pub. No. 2009/0030910 published to Bennett et al. on Jan. 29, 2009; U.S. Pat. No. 4,491,725 issued to Pritchard on Jan. 1, 1985; U.S. Pat. Pub. No. U.S. 2008/0262883 published to Weiss et al. on Oct. 23, 2008; U.S. Pat. No. 65,950,169 issued to Borghesi et al. on Sep. 7, 1999; and International Pub. No. WO 2010/091372 published to Sholer et al. on Aug. 12, 2010.

Employing and implementing the present invention provides a paradigm shift in insurance management that is quite large and exists in several veins and contexts, most of which has significant economic impact. For example, it has been estimated that eighty percent (80%) of each insurance premium dollar collected in the United States is paid out annually for insured losses, e.g. as pay out to the insured and related expenses. This payout is estimated at $358 Billion per year. Thus, if only a one-percent (1%) efficiency reduction were achieved, for example by preventing residential property losses by proactively warning individual policyholders of a specific weather threat and providing them specific and timely actions to take to mitigate if not eliminate potential property losses, an annual savings of $3.58 Billion could be realized. It has also been estimated that forty to fifty percent (40%-50%) of annual pay outs are made to third-party suppliers of goods and services, e.g. automotive body shops and associated auto parts to repair damaged vehicles left outside during a hail storm. Again, a one-percent (1%) efficiency improvement, for example, by proactively contacting individual policyholders to request that they shelter their vehicles immediately due to a high probability of vehicle damage due to a passing hail storm, could yield an annual savings exceeding $1.43 Billion. Similarly, significant savings may accrue through more informed bargaining between an insurance company and third-party suppliers of goods and services due to more timely and accurate notice of a significant weather event. For example, in the case of a hail storm predicted to impact a significant number of residential homes, the insurance company may, before the storm actually causes property damage, enter into repair contracts with roofing contractors and material contracts with roofing suppliers. Such contracts would undoubtedly be under more favorable terms, i.e. cheaper, when negotiated before actual damage occurs because the demand for the goods and services would be less than it would be after the storm had actually realized property damage.

As a more localized illustration of the economic impact of a paradigm shift in the management of insurance losses, consider a scenario involving Highlands Ranch, Colo., a Denver suburb, where there are approximately 45,000 residential homes. Assume Acme Insurance Company insures 7,500 of the homes, and 3,000 are active participants in a cooperative new-paradigm system (the subject of the invention) which can proactively warn individual policyholders of specific weather threats. The 3,000 active participants receive and properly respond to a warning by Acme Insurance of an impending storm and told to take specific actions within a specific timeframe, e.g. board up their windows, pull vehicles into garages, and ensure an abundant supply of gasoline for electrical power generators. These properties suffer $30,000 in damage, whereas the other 4,500 homes suffer $50,000 in damage. As such, the net savings to Acme Insurance is 3,000 homes times $20,000/home, or $60 Million. If such a situation occurs on average every other day, the savings to Acme Insurance is over $10 Billion annually.

One aspect of certain embodiments of the present invention is directed to how an insurance agent interacts and communicates with policyholders in anticipation of a potentially catastrophic event.

Another aspect of the present invention is directed towards rehabilitating the reputation of insurance companies and insurance agents with respect to the legitimate concerns of an insured, especially when the insured is faced with an imminent crisis that could trigger policy coverage issues. By way of example, but noting that such scenarios are only some of many possible scenarios, the following sets forth a situation of an insured and an insurance agent (or insurance company), when an impending hail storm is predicted by a weather service. Technological advances in weather forecasting has permitted far better information to be provided to the populace with respect to precisely where damaging hail storms may hit, including not only the scope of territory, but also the duration and even potential hail sizes involved. The consequential damages from such storms can now be generally appreciated and assessed by sophisticated informational databases. The particular damage caused by any specific hail storm, however, is largely dependent upon the measures taken by individuals in securing their insured valuables from damage. For example, by putting one's car in a covered garage, the damage that would otherwise be incurred in a hail storm is precluded due to such proactive measure. A practical problem, however, is that with the majority of the adult work force being otherwise occupied during the work day, a potentially damaging hail storm forecast for a residential neighborhood, where the worker may reside, may not permit the worker to leave work in order to protect valuables that are encompassed by an insurance policy. If such worker were, however, notified with sufficient time in order to take such protective measures, significant and substantial damages to covered policy items could be avoided. Oftentimes, however, insurance policyholders do not appreciate at any given time what particular items are covered or not under their policies and thus, absent such policyholder's reviewing their policies on a fairly frequent basis, the probability that a policyholder would appreciate what particular items may be susceptible to damage from a natural occurrence may be remote. One aspect of the present invention therefore involves the direct communication between an insurance agent and/or representatives of an insurance company with the policyholder, or designated representative of a policyholder, in order to not only forewarn the policyholder of a potentially damaging and imminent event, but also to advise and/or remind the policyholder of what particular items are covered under the policy.

For example, one particular aspect of the present invention involves pre-warnings communicated to a policy holder of worrisome future events such that protective measures can be taken. For example, an insured may receive a communication from its insurance agent that a recent spate of burglaries has taken place in the insured's neighborhood, thus alerting the policy holder to such a threat. In response to such warning, the policy holder would be advised, for example, to secure particular valuables that may be at risk (e.g. jewelry, etc) that is aligned with police reports of recent local burglaries. Verification that such measures have been taken by the insured can be provided via an iPhone picture of the jewelry being placed in a safe, etc. A benefit of a reduced premium if such verification is sent to the agent within a prescribed time period and with prescribed content, dating, etc. can be offered to incentivize the policy holder to take such protective actions. Moreover, the policy holder may also be invited by the insurance agent to evaluate and secure coverage for any recent acquired jewelry that might not have otherwise been covered—thus providing the insurance agent with an additional sales opportunity, and providing the individual comfort that his/her jewelry assets are properly insured.

As a practical matter, such a sharing of information with the policyholder may even trigger the policyholder to appreciate and recognize that additional coverage is required, for example, for a newly added addition to a house, a new vehicle, building structure, etc. For example, while impending threats of harm to valuables is one aspect of the present invention, another related aspect involves a recent acquisition by an insured of additional valuables that the policy holder may have failed to appreciate is not covered under an existing policy. Notification of such events and coordination of coverage to address such events is one aspect of the present invention. In a case where an individual purchases a new jewelry piece, such a purchase could be tracked by the store where the item was bought, then by the insurance agent responsible for the client's coverage, and then raised in appropriate communications to the individual to ensure that the individual has made a conscious choice to not have such a new item covered under a policy—and/or to confirm that such a new purchase is already covered under existing policies. Thus, in a more interactive fashion, the agent can engage in communications with the policy holder on a proactive basis that is both appreciated by the policy holder and that at the same time, may result in increased business for the insurance agent. The binding ties that such periodic communications has on a consumer are well recognized, and deter such client from considering alternative prospects with other insurance agents. Thus, not only will such a communication from the insurance agent to the policyholder provide some forewarning of potentially damaging consequences with respect to covered items under a policy, such a communication may also further advance both the insured's interest and the insurance agent's interest in making sure that the policyholder has properly identified all valuables that should be properly protected under an insurance policy. Thus, rather than an insurance agent simply cold-calling clients to remind them that they may wish to have additional insurance in case they acquire new valuable items, the occasion of an imminent threat to physical harm with respect to already covered items provides an opportunity for the insurance agent to make a non-harassing and beneficial contact with a policyholder.

In certain embodiments of the present invention, distinct profiles are employed to facilitate computerized assessment of imminent physical threats to persons and property so as to facilitate appropriate communications that lessen the opportunity of catastrophic damage. For example, particular profiles in certain embodiments include policyholder profiles (e.g., types of policyholders by items covered, duration of policy, policy limits, policy minimums, potential loss potentialities, etc.); vendor profiles (e.g., roof repair services, car repair services, water damage services, wind damage services, etc.); event horizon profiles (e.g., damage caused by wind, snow, rain, hail, ice storms, etc.); and insurance type (e.g., fire, life, property, jewelry, etc.). In certain embodiments of various aspects of the present invention, a prioritization scheme is set forth that facilitates the selection of discrete and identifiable profiles to mix and match in order to formulate a desired communication protocol, as further described herein.

Yet another factor to be analyzed and employed in certain embodiments of the present invention link probability profiles with respect to not only the occurrence of particular events, but with the potential damage assessments arising therefrom and the potential avoidance of claims being made due to proactive conduct being employed. Such proactive conduct may be evaluated upon one or more of the following: temporal periods prior to a physical event; modes of communication employed to contact an insured; degree of repetition of communication efforts and duration, repeatability, variety and subject matter of communications employed in view of changing situations as temporal and situational aspects change.

For example, an impending hurricane may be predicted days in advance, which may suggest that communications to a more general populace of insureds be employed through reverse-911 messages having a less urgent tone, but that communicate to the policyholders a general cautionary message as to protecting persons and property from potential damage. As the hurricane event draws closer, however, more particularized information with respect to the scope, severity, prospects of wind/hail/water damage can be better assessed and communications to more directed, and/or isolated for fewer policyholders can be made, with consequently more detailed information being employed, as well as the urgency and directness of communications made via computerized or personal messages. Such messages can be predetermined and preselected according to the particular severity of events as further dictated by temporal aspects of when the event is due to occur and what particular territories it will impact.

It is illustrative to contrast the above scenario with and without the invention. Currently, if a policyholder residing in northern Virginia receives generalized news of an approaching storm, he is left to guess (and worry) as to whether the storm poses a realistic threat to his property. For example, he may be about to depart on a vacation and waiting in a lounge area, and see on a television that an hail storm is approaching northern Virginia, but cannot identify whether the storm will actually strike his area of residence (Fairfax County) or pass to the northwest through adjacent Loudoun County. With such inaccurate data, he is left simply to wonder and worry as to whether his properties (e.g. residential home, cars parked outside) are at risk. In contrast, with use of the invention in some embodiments, he may be contacted via e-mail, cell phone message, instant message (or other means known to those skilled in the art) that the ice storm is predicted to pass well west of both Fairfax and Loudon counties and therefore there is nothing to worry about and no action to be taken. In another scenario, the policyholder may be relaxing in his backyard in Champaign, Ill. while clouds gather unnoticed overhead. In some embodiments, the invention communicates to the policyholder that a rapidly-moving tornado is predicted to pass near his home within the next thirty minutes and advises him to seek shelter and bring his vehicles into the garage. His neighbor, without the invention, is devoid of such a warning and assumes that the gathering clouds, if he notices them at all, are just a mild transient weather system and takes no action. While the neighbor is able to seek shelter just prior to the tornado, his vehicles are left outside and severely damaged. The above scenarios involve pre-peril or pre-incident scenarios. In both of these scenarios, benefits to multiple actors accrue. The policyholder is given at minimum peace-of-mind as to threatening weather events regarding his property, and at maximum is able to minimize if not eliminate damage to his property. The insurance company is at minimum able to build good-will with his policyholder customer, which may translate to the purchase of additional or expanded insurance policies, and at maximum reduce his policy payout as assets were proactively sheltered and protected from damage. And agents of the insurance company will feel proud of the pro-active job their employer is doing for its customers, therein raising employee agent satisfaction and perhaps translating into increased employee retention and thus reduced labor costs.

As a further illustration of the application of the invention and its benefits, the increased communication provided by the invention also allows, for example, an insurance company to more pro-actively and efficiently manage after-peril "incident management" activities. For example, with the increased knowledge of the storm track and/or early warning of the storm, the insurance company may contact repair contractors (e.g. roofing companies) to be positioned for early repair after the storm passes, or might pro-actively place orders for roofing supplies (e.g. shingles) well before damage has accrued, thereby ensuring that roofing repairs will be timely. Such supplies could also be pre-positioned at a nearby but safe location until the storm passes. Again, the benefits are numerous and attach to multiple stakeholders or actors. For example, the policyholder is more satisfied because his roof was repaired more quickly, and the insurance company accrues benefits of greater negotiating leverage (and thus lower prices) by ordering supplies earlier while they are in abundant supply.

It is illustrative to consider an after-peril, or so-called incident management, scenario with and without the invention. After a significant incident of peril, for example the afore-mentioned hail storm, it is typical for a wave of policyholders to contact their insurance agent to file an insurance claim. Some policyholders will solely call their agent, some will physically arrive at the agent's office, and some will do both. In any case, the agent will typically be overwhelmed with insurance claims presented by policyholders. The environment will commonly become tense, because the policyholders have suffered some loss, typically at least to property but sometimes injury or death to family members or neighbors, and the agent is unable to process the claims in a timely manner. In contrast, the invention in certain embodiments, may allow the policyholder to electronically submit his claim to the agent and/or directly to the insurance company. A direct submission to the insurance company may be provided in an embodiment of the invention in which the invention determines that the policyholder indeed was within the corridor of storm damage and the associated required coverage data is valid (e.g. number and types of vehicles), and the policy holder simply needs to attest to the damage. The benefits of the application of the invention in such a scenario include more-timely filing of all policy holder claims—those filed immediately via the invention clearly are expedited but also those not filed via the invention receive quicker processing because the total number of claims so traditionally processed has decreased. Such reduced processing time increases policyholder satisfaction, which, as stated above, may translate to the purchase of additional or expanded insurance policies. Also, agents of the insurance company will feel proud of the pro-active job their employer is doing for its customers, therein raising employee agent satisfaction and perhaps translating into increased employee retention and thus reduced labor costs. Further, the agents are able to direct more of their time on sales of new or expanded insurance policies and less on claims processing. It is also likely that data-entry errors in submitted claims will be reduced when the invention is utilized, as less human (e.g. insurance agent) data entry is required. Lastly, claim processing will realize efficiencies generated by identifying claims that are more complex (e.g. due to variety of properties covered, those with special terms and conditions) as enabled by more accurate, comprehensive and timely presentation of claims. Such claim processing efficiencies will be significant, because it has been estimated that typically twenty percent (20%) of claims drive approximately eighty percent (80%) of insurance losses and expenses. In certain embodiments of the present invention, actors such as the insured are empowered to contact others to act on their behalf, i.e. they are able to designate an agent. For example, with respect to the afore-mentioned hurricane event, if the policyholder is unable to perform a specific act (e.g. he is out of town on vacation) such as driving a vehicle into a protected area, the policyholder may contact a friend or family member to secure the vehicle into a protected area.

In other examples, the insured can provide instructions that confidential entrance or security codes may be accessed by first responders to facilitate entry onto an insured's premises to save lives or property. For example, in the event of a fire approaching one's residence, the distant owner could have provided the agent with pre-approval to access security codes so that firemen or police officers or other responders could enter the premises to recover valuables before the dwelling is destroyed or injuries occur. Similar pre-approved instructions as to how emergency events are to be addressed is an element of various aspects of the present invention, as this provides far more efficient attention to property and life-saving measures that benefit both the insured and the insurance company. Security alarm companies may, therefore, be provided with instructions to communicate code information to first responders so that an insured's interests are addressed, even if the insured is unable to actively participate appropriately during the temporal emergency.

In one embodiment, the level of responsiveness of a policyholder is monitored and used to assign a responsiveness index or measure to a particular policyholder. For example, the responsiveness index may be the percentage of times a policyholder was deemed to have adequately responded to a notice by the system or an action requested by the system. Adequate may be satisfied by responding within a set time frame. Further, the responsiveness index may be correlated with a policyholder's membership status in a preferred membership program, such as Gold, Silver, Bronze or non-member level, respectively considered high to low status levels. For example, a Gold member may need only have a 50% or better responsiveness index to be deemed responsive, whereas a Silver member may need 60% or better, a Bronze member 70% or better and a non-member 90% or better. Also, the responsiveness index, as correlated with membership status, may be used to determine the status of an insurance claim for an insured asset as at least one of a) approved, b) conditionally approved, and c) denied. That is, if a particular policyholder's responsiveness is deemed responsive, his insurance claim may be immediately approved and the system takes action to so inform or notice the policyholder. In contrast, if a particular policyholder's responsiveness is deemed non-responsive, his insurance claim may be immediately denied and the system takes action to so inform or notice the policyholder. In certain embodiments of the present invention, some or all of the communications between participants or actors occur simultaneously or near-simultaneously and/or synchronously or near-synchronously. For example, a warning regarding a hurricane threat may be noticed or broadcast to all or nearly all actors at the same time thereby providing a real-time or near real-time warning. Other actors may be able to query or simply passively receive notice that one or more other actors have received and/or read the notice. Similarly, as an example of a post-peril scenario, when a policyholder files a claim all or some other actors are noticed of the claim filing in a simultaneous or near-simultaneous and/or synchronous or near-synchronous manner.

In certain embodiments of the present invention, some or all of the communications between participants or actors occur in sequence and/or asynchronously. That is, one actor is noticed and then others are noticed in a defined sequence.

In certain embodiments of the present invention, some communications between participants or actors occur in a simultaneous or near-simultaneous and/or synchronous or near-synchronous manner and other communications occur in a sequence and/or asynchronously.

Certain embodiments of the present invention involve a system and method where re-insurers interact with insurance actors, such as insurance companies, in order to better utilize each others' expertise and resources in order to mitigate loss due to peril, as well as promote good will and company loyalty and reputation with policyholders. By doing so, re-insurers can dictate to their respective insurance companies several "best practices" to be followed in order to achieve these objectives, and ultimately to avoid payout of proceeds, reduce the number and extent of claims and thereby increase economic efficiencies of the re-insurance operations.

In certain embodiments of the invention, insurers interact with the system by employing certain re-insurance information in a coordinated fashion with other insurance companies (as dictated by the re-insurer) and various aspects of the present invention are thus directed to technology that permits such coordinated communications. In such a manner, the re-insurer can govern how best to broadly assess and facilitate risk plans in a fashion that reduces internal and recurring costs, while preserving valuable revenues for other uses. Thus, in one embodiment, a re-insurer coordinates between at least two other insurance companies certain procedures that will be followed in predicting the severity of a catastrophic event and peril, as well as how pre-peril conduct on behalf of the insurance representatives will result in overall reduction in property damage, and thus claims made against the insurance companies.

Re-insurers have significant data relating to catastrophic events and peril and can use such data to analyze and project the occurrence, predict the severity and create models of catastrophic events and other peril. Such data can be used in unique ways to coordinate efforts and procedures employed by insurance companies so that they are better able to manage risk and minimize loss due to peril. Re-insures can use such data to create and fine-tune re-insurance policies so as to better help spread the loss due to peril.

For example, U.S. Pat. No. 7,280,920 issued to Whiteside et al. ("Whiteside"), incorporated herein by reference in its entirety, involves an earthquake forecasting system that collects data in a database to used to determine the probability and magnitude of an earthquake in an area of interest, and create an alert of a possible earthquake, including alerting users of the system of a potential earthquake in areas of interest selected by the user. Whiteside also discusses the potential to mitigate certain losses due to earthquakes based on the predicted earthquakes.

U.S. Pat. No. 7,783,673 issued to Schneider et al. ("Schneider"), incorporated herein by reference in its entirety, and assigned to Swiss Reinsurance Company pertains to a system and a method of detecting emerging risks in various systems and relating the detected risk and its relative impact on a system or a product such as an insured asset. Schneider describes a system and a method that facilitates the exchange and collection of information regarding perceptions of recognized and newly emerging risks over multiple defined geographical areas. Schneider recognizes that relating a detected emerging risk to its relative impact facilitates a timely set up of precautions and preventive measure in preparation of the impending consequences. Schneider also recognizes that detecting emerging risk to its relative impact on an insurance product makes it possible to assess the consequences of undesired or critical states and events associated with the particular risk for the insurance product itself, such as the number and amount of insurance claims that would need to be paid. Although Schneider describes a system and method that provides an output that may include an instruction related to preventative or recovery measures in an external system, Schneider does not provide for comprehensive management and the most efficient and cost effective response to those instructions. Certain embodiments of the present invention create an integrated real-time system that not only may include an instruction related to preventative or recovery measures, but also the appropriate actions, and ways to ensure and incentivize compliance.

U.S. Pat. No. 8,024,205 issued to Bresch et al. ("Bresch"), incorporated herein by reference in its entirety, and assigned to Swiss Reinsurance Company pertains to a system and method for calculating damage as a result of natural catastrophes and associating insured objects with a risk type and geographical risk area for a risk group, and uses information such as data related to natural catastrophes.

U.S. Pat. Pub. No. US 2008/010384, by Lewis et al. ("Lewis"), incorporated herein by reference in its entirety, pertains to a method of providing re-insurance coverage by adding different types of coverage not typically included in a re-insurance policy agreement.

International Application No. WO2004059420, by Dyrnaes et al. ("Dyrnaes") incorporated herein by reference in its entirety, pertains to a technique for providing real-time analysis to provide underwriting based on location of coverage, taking into account factors such as risk of fire, release of hazardous materials, and other causes of peril.

European Patent Publication No. EP2461286, by Aebischer et al. ("Aebischer") incorporated herein by reference in its entirety, pertains a method and system for predicting how often loss may occur in the future and how to then address loss after a perilous event.

U.S. Pat. Pub. No. US 2002/0046066, by Laurenzano, incorporated herein by reference in its entirety, pertains a method to manage risk of loss by determining an amount of unrealized economic benefit and reducing the amount of indemnification by the amount determined. By way of providing additional background, context, and to further satisfy the written description requirements of 35 U.S.C. §112, the following references are incorporated by reference in their entireties for the express purpose of explaining the nature of the re-insurance contracts and methods to further describe the various systems, sub-systems, tools and components commonly associated therewith: U.S. Pat. No. 8,229,772 issued to Tran et al. on Jul. 24, 2012; U.S. Pat. No. 8,219,425 issued to Thomas et al. on Jul. 10, 2012; U.S. Pat. No. 7,860,734 issued to Solanki et al. on Dec. 28, 2010; U.S. Pat. No. 7,844,528 issued to Ziade et al. on Nov. 30, 2010; U.S. Pat. No. 7,693,731 issued to Weber et al. on Apr. 6, 2010; U.S. Pat. No. 7,707,050 issued to Chen et al. on Apr. 27, 2010; and U.S. Pat. No. 7,315,842 issued to Wang on Jan. 1, 2008.

In certain embodiments, the re-insurers interact with cedants to take preventative measures, such as having the insurance agent contact policyholders to warn them of impending peril, including where such peril is believed to be most severe and cause the most damage, such that the policy holder can individually take preventative measures to mitigate the severity of loss in the areas that are most likely affected.

In certain embodiments, re-insurers inform agents that peril is imminent and the agent should contact policyholders to take potential damage mitigation activities. An agent then apprises the policyholder that peril is imminent. Re-insurer, agent and policyholder all coordinate their interactions to determine the appropriate potential damage mitigation activities appropriate for the particular circumstances, depending on the peril.

For example, in the event of a tornado, re-insurers can utilize data regarding prediction and mitigation, to determine the probability and severity of damage likely to be caused by a tornado in a particular area. The re-insurers then contact cedants local or close to the area where the tornado is predicted to do the most damage to notify the cedants of the peril. Then, the cedants, having local resources, can notify the policy holders to take the appropriate actions to mitigate loss due to the tornado. Policyholders therefore benefit from loss prevention, insurers benefit from having to pay out less, and re-insurers benefit because peril that would have once triggered the re-insurance policy will now have been mitigated and the re-insurance policy is not triggered. Mitigation responders could also interact with policyholders and agents to also determine appropriate potential damage mitigation activities to be taken by mitigation responders.

Traditionally, re-insurers use tools that focus on mitigating loss by anticipating peril that may happen at some unknown time in the future. In certain embodiments, re-insurers are able to utilize the resources of cedants, who may be better equipped to contact the policyholder that owns the assets in peril. Thus, re-insurers have another avenue to mitigate loss due to peril, even as the peril is occurring in real time. By adding this dynamic to the loss mitigation strategy, re-insurers can eliminate inefficiencies and waste that results from being "overly pro-active," i.e. peril never occurring, or alternatively, being solely reactive and relegated to fixing damage only after a loss has occurred.

In other embodiments, insurance companies can provide the information regarding the amount of benefits paid to policy holders who use the system and method described in the present invention to help re-insurers further refine their policies. The information may include the amount of money and resources saved by use of the system and method described herein. The reciprocal nature of the sharing of information and resources helps refine the types of policies offered by each, and the savings can thus lower premiums for the policyholders.

Yet another aspect of the present invention relates to a request for verification that such communication was made, with a policyholder proactively responding to an insurance agent's request that the policyholder confirm that information has been received. Such a verification and/or confirmation step may be particularly important in various regards, including prevention of fraud by policyholders that wrongfully later contend that no pre-warning of an imminent threat of a natural disaster was ever made by the insurance company or insurance agent, and thus, for example, a car was left in a driveway outside a covered garage and therefore suffered damage. If the insurance company and/or insurance agent can verify that a communication was made directly to the policyholder to mitigate perceived imminent damage to such a vehicle by merely pulling the vehicle into a covered garage, the insurance company and/or insurance agent can better assess whether, for example, the policyholder may have purposefully left a valuable insured item in harm's way. In such a manner, such verification and confirmation steps can be employed by an insurance company to further reduce its responsibility to cover certain claims that should not properly be covered due to the insured's failure to properly mitigate damages.

Similarly, other verification steps, such as satellite imagery from Google Earth, surveillance cameras, private or commercial security systems or cameras, etc. can be employed to determine the timing of when communications were made and what conduct the insured may have taken or not taken to avoid claims being made on the policy that could have otherwise been avoided. Such method can be used to investigate fraud (e.g., a policy holder purposefully pulling a car out to get damaged by hail).

Thus, in one embodiment, the insured is provided with a financial incentive (e.g. reduced premiums, etc) to have installed surveillance cameras in predetermined and mutually agreeable areas (e.g. understanding of placement of cameras between the insured and the insurance agent on particular residence areas where losses may be determined to possibly occur in the future) so that a visual record of events can be provided to assess losses, verify particular conduct (e.g. the pulling of a car into a garage prior to a storm), etc. that can be used in confirmation, verification and compliance steps of the various inventive methods as set forth herein.

From a more positive perspective, an insured should feel that its legitimate interests in protecting its property are being monitored by the insurance agency or insurance agent by virtue of the agent making proactive contact with the insured to attempt to secure and protect persons and properties subject to damage from impending natural events. Thus, legitimate policyholders will appreciate the benefits provided by the present invention while dishonest policyholders that attempt to improperly make claims on a property and/or person damaged that could have easily and readily avoided, can be discerned and dealt with appropriately.

In certain embodiments of the invention, covered assets where risk of loss can be minimized by preventative measures are clearly detailed in the policy. Tracey describes a system where customers can log onto a web portal and enter information about their business. The customers can then select whether they would like to select particular theft prevention expertise and technologies, or whether the system should automatically select what it considers based on the customer's information. The features can be shown to effectively reduce the risk of loss, and correspondingly provide a premium reduction to the customers. Tracey's system, however, does not provide a real-time interaction between actors and does not address reducing inefficiencies and rehabilitating reputation related to what has become an adversarial interaction between policyholder and agent or adjuster.

In embodiments of the present invention, if the insured confirms certain damage mitigation actions were taken, disputes regarding policy coverage of these particular items are minimized, addressing the current problems not addressed in the prior art such as the often adversarial "back and forth" between the policy holder and the insurance agent as to whether the items are covered in the event of peril. The insured can avoid the uncertainty and hassle of an insurance company disputing whether the loss is covered under the insurance policy simply by confirming that the insured received the notification and took the appropriate action.

Thus, in the event the preventative measures did not completely eliminate the loss, there is no question that whatever loss resulted due to the peril is covered by the insurance policy. In these embodiments, the insurance company can be assuaged of fears of insurance fraud, because the insured made an affirmative representation that they received notification and took such appropriate measures.

As one can understand, the present invention is more globally directed to a "kinder and gentler" approach to addressing catastrophic events in a manner such that the traditional, but potentially adversarial relationship between a policyholder and an insurance company in the midst and directly after a catastrophic event is avoided. Instead, the relationship between the policyholder and its insurance company is fostered through prompt, informative and beneficial communications made to the policyholders so that damages experienced by the policyholder, and consequently claims made upon the insurance company, are vastly reduced. Instilling such a business model into existing insurance company industry standards is projected to provide enormous savings to claims made to policies, the entire insurance defense industry relating to the handling of claims, the enhancement of the policyholder/insurance company relationship, the ability to reduce premiums given that the risk benefit analysis algorithms will be significantly and beneficially modified so that insurance companies can better assess damage to particular properties after obtaining nearly real time communications as to the protection of particular insured items.

For example, U.S. Pat. No. 8,219,425 issued to Thomas et al. on Jul. 10, 2012 ("Thomas") incorporated herein by reference in its entirety, recognizes that there are significant costs to insurers regarding loss adjustment expenses and significant costs to policy holders expended in getting coverage, substantiating their losses, and providing that those losses were covered under the insurance policies. Thomas teaches a method and system where parties can reduce costs by providing an insurance policy that is better tailored to the parties needs by referencing payments on insurance policies, and including reinsurance policies to determine the needs of the insured party. Thomas is incorporated by reference in its entirety.

In one embodiment of the invention, improved effectiveness and/or efficiencies are achieved through more timely and/or comprehensive data exchange between parties involved in after-peril (i.e. incident management) activities. By way of example, consider a scenario in which a severe storm has knocked-out power to a residential area and emergency responders have been called to the area to investigate a gas leak. Most residents have evacuated the area. The area is a gated community in which most homes have security systems with attendant alarms. The emergency responders begin to narrow-in on the source of the leak and, unable to contact the homeowners, begin to destructively enter the homes to investigate. In contrast, those homeowners who are participants in the method and/or systems of the present invention are notified of the emergency (by any of various means of communication to include cell phone, instant message, e-mail as known to those skilled in the art) and simply asked to authorize a shut-off of their alarm system, or release of the security code to the emergency responders, or similar so that the emergency responders are able to gain non-destructive access to the home. Further, the invention could authorize and provide a floor plan of the home to the emergency responders, such that if a fire were to erupt (e.g. precipitated by the gas leak explosion), the emergency personnel will be effective in combating the fire.

As such, benefits to the homeowner and insurance company accrue, such as cost and time savings in not having to repair a broken-in door, mitigation of fire damage, and increased safety to fire fighting personnel in having a floor-plan of a fire-engulfed home prior to entry.

In one embodiment, a security code is transmitted between actors comprising a plurality of alphanumeric characters, numbers, and letters. In one embodiment, the security code comprises four alphanumeric characters, four numbers and/or four letters.

In one embodiment, the insured provides pre-instructions to release his/her code to the insurance agent, (which may be rendered additionally time sensitive and/or renewable so as to require updating to ensure on-going consent in the event situations change in the future) who is authorized to then communicate the same to first responders such that access to a dwelling or property can be achieved. In addition, further instructions as to what is permitted or not permitted may be provided by the insured under such circumstances such that the insured is provided with a customized response in the event of future potential episodes where property or lives are at risk. This pro-active communication and integration of insurance agents into the practical lives of an insured is one aspect of the present invention in its various embodiments, implemented in a fashion such that immediacy of action and thus saving of valuable assets and lives, is achieved.

In another embodiment, the system and method for comprehensive management and minimization of insurance loss is applied to health care. More specifically, in one embodiment of the invention, a system and method for comprehensive management and minimization of health care costs is provided.

The cost of providing health care to our society has mushroomed in recent years, exceeding the capacity of governments and private institutions to adequately finance such cost. Consequently, the budgets allotted to health care facilities of all kinds, both public and private, are under continuous pressure in this era of fiscal restraint. In an effort to provide adequate service to the public yet conserve financial resources, it is highly desirable to comprehensively manage the allocation of health care resources and the interactions of the actors involved, such as the health care-provider, the health-care insurer, and the patient or party seeking engagement with the health care system. What is needed is a comprehensive system and method of monitoring activities that impact health care costs, assessing possible actions to mitigate the impact of such activities or stop them, and executing recommended actions by providing the health care actors with timely and relevant information and empowering them to take action.

Traditional approaches to minimization of health care costs and/or maximization of efficiency have focused on a reduced set of health care system components and empower only a selected set of actors. For example, U.S. Pat. No. 5,778,345 to McCartney ("McCartney") incorporated herein by reference in its entirety, provides a method and system for evaluating health care provider performance, forecasting health care resource consumption on a macroeconomic scale, and optimizing the allocation of health care resource. The method includes the steps of a) providing patient discharge data which includes an address field indicating one of a plurality of micro-geographical areas (MGAs) wherein a patient resides, b) establishing a referral population for a subject health care provider based upon the market share it has for each cohort in each MGA, c) calculating occurrence rates of medical service demand for the referral population, d) providing and applying population growth factors to the referral population thereby projecting it to a future time, e) applying the occurrence rates to the projected referral population thereby forecasting the consumption of health resources, and f) allocating health care resources in accordance with the forecast. The invention can also factor into the forecast the expected caseload demand from undeveloped or proposed communities. Finally, the invention provides for a method for efficiently allocating health resources amongst neighboring health care providers, based on either current or forecasted medical service demand data. McCartney focuses on the health care provider and does not provide for comprehensive management and minimization of health care costs.

U.S. Pat. Pub. No. 2010/0262436 published to Chen, incorporated herein by reference in its entirety, provides an integrated medical information management system. The Chen system allows users or patients to manage their own medical information worldwide in a portable device to enhance medication adherence and self-management of personalized health care. A multi-functional medical information center is developed to manage medical information received from various resources and operated at a cost-effective manner for stakeholders. In addition, the quality control of medical data management is guarded by side-by-side comparison technology to warn inconsistent information in medical billing history to prevent medical insurance fraudulent claims. The Chen system is focused on patient medical information and does not provide for comprehensive management and minimization of health care costs.

U.S. Pat. No. 8,036,915 to Kremer ("Kremer") incorporated herein by reference in its entirety, provides a system and method that employs standardized data collection forms for use by health care providers and patients to enable efficient collection, storage and management of patient data for treatment of diseases, such as rheumatoid arthritis. Kremer does not provide for comprehensive management and minimization of health care costs.

U.S. Pat. No. 5,544,044 to Leatherman ("Leatherman") incorporated herein by reference in its entirety, provides a software-based medical information system which performs a method of analyzing health care claims records for an enrolled population (e.g., HMO, Medicaid) to assess and report on quality of care based on conformance to nationally recognized medical practice guidelines or quality indicators. The system analyzes health care received by enrollees having a specified health care condition by: providing to the system health care claims records for a selected enrollee population; defining at least one health care condition in terms of health care events reportable in health care claims records; identifying in the health care claims records those enrollees meeting the definition for that health care condition; defining health care quality criteria for that health care condition in terms of health care events reportable in health care claims records; comparing the health care quality criteria for the at least one health care condition to the health care claims records for at least a portion of those enrollees meeting the definition for that health care condition; and developing and outputting from the system a health care quality report based on the comparison and formulating action recommendations to improve care. The Leatherman system concentrates on providing a means to supplement claims data with data from patient medical records. Leatherman does not provide for comprehensive management and minimization of health care costs.

By way of providing additional background, context, and to further satisfy the written description requirements of 35 U.S.C. §112 with respect to the embodiment of the invention regarding a system and method for comprehensive management and minimization of health care costs, the following references are incorporated by reference in their entireties for the express purpose of explaining the nature of the health care processes and methods to further describe the various systems, sub-systems, tools and components commonly associated therewith: U.S. Pat. Pub. No. 2003/0216938 published to Shour on Nov. 20, 2003 and U.S. Pat. No. 7,693,728 to Underwood.

By way of example to illustrate the embodiment of the invention in which the system and method for comprehensive management and minimization of insurance loss is applied to health care, the following example is provided. Consider a scenario in which Patient has elevated cholesterol and is over-weight. The Patient carries health insurance as provided by health insurance Agent. Patient has been prescribed by his treating Physician to take a daily medication of a statin such as Lipitor™ as filled by Pharmacist, instructed to obtain a monthly cholesterol blood test at Clinic and to exercise at least 30 minutes per day at Gym. The actors involved in this scenario are Patient, Physician, Clinic, Pharmacist, Gym and Agent. Here, the "peril" is an increased risk of harm, such as a stroke or death, if Patient does not follow the above described regimen. The Surveillance and Monitoring Module (SMM) would record Patient attendance and participation at Gym. For example, recordings of Gym pass entry time and exit time may be recorded, but may also include time on treadmill and intensity of workout. The Surveillance and Monitoring Module may also record whether Patient refilled his statin via Pharmacist at the proper time, that is, before his current allotment of medication was emptied, whether Patient attended his scheduled monthly blood test, and record any other medications obtained. The results of the blood test are also provided to the Surveillance and Monitoring Module.

At the Action Assessment Module (AAM), data gathered by the Surveillance and Monitoring Module is analyzed. If additional data is sought by the AAM, such requests are sent from the AAM to the SMM. The Action Assessment Module will analyze the data provided by the SMM, as well as static data such as one or more tables of risk, to determine if any action is required to mitigate the peril. A table of risk may provide that one missed Gym session every five days is of low peril and requires no action, whereas a missed prescription refill may indicate moderate peril. Similarly, a relatively poor blood test result may indicate high peril and require action. The AAM may also determine if there are any conflicts between or concerns with the medications that the Patient has obtained, which in some situations could generate a warning to Patient as to use.

The Action Execution Module (AEM) will receive input from the Action Assessment Module and implement the action. For example, perhaps Patient has missed three Gym sessions in a row and has neglected to refill his monthly prescription. The AAM may assess such a set of facts as placing Patient in moderate peril and determine that a call or text to Patient querying him as to his conduct is a recommended action. The AEM will then automatically text the Patient or task Agent to call Patient.

This scenario also has potential to align interest and/or incentives of the actors involved. For example, Patient is assumed to be motivated to minimize his peril and undoubtedly is motivated to reduce his health insurance premium to Agent. Agent is interested in a healthy and long-term insurance client who will not only continue as a health insurance client, but also, for example, as a property and casualty client under a different policy. As such, the Agent may offer a financial discount, perhaps 5% discount on premium, if patient enrolls in the system described above. However, enrollment would require the automatic monitoring of Patient's attendance and participation at Gym, participation in regular blood testing and sharing of status of prescription refills. Thus, a comprehensive management and minimization of health care costs is provided.

In another embodiment, the system and method for comprehensive management and minimization of insurance loss is applied to the construction industry. More specifically, in one embodiment of the invention, a system and method for comprehensive management of a construction project so as to minimize construction costs and/or financial risks and/or construction site losses is provided.

Many disparate parties with specialized interests, risks and rewards are involved in construction projects. Different sets of parties are considered when analyzing or considering a particular construction project, depending on the area of interest or emphasis. Interactions between the designated parties may vary widely between formal contracts and informal agreements. Incentives and penalties may also vary in severity and metrics.

When analyzing the project nature of a construction project, i.e. project construction management, three parties are typically considered: the property owner, the designer/architect/engineer and the builder a.k.a. general contractor. Traditionally, there are two principal contracts between these parties as they work together to plan, design, and construct the project. The first contract is the owner-designer contract, which involves planning, design, and construction administration. The second contract is the owner-contractor contract, which involves construction. An indirect, third-party relationship exists between the designer and the contractor due to these two contracts. An alternate contract or business model replaces the two traditional contracts with three contracts: owner-designer, owner-construction project manager, and owner-builder. The construction project management company becomes an additional party engaged in the project to act as an adviser to the owner, to which they are contractually tied. The construction manager's role is to provide construction advice to the designer, on the owner's behalf, design advice to the constructor, again on the owner's behalf, and other advice as necessary. The mechanics of project management for construction projects have traditionally involved tracking of milestones and metrics associated with a defined work breakdown structure. Periodic work inspections are performed to allowing tracking of project progress. Formal change orders are commonly used to adjust activities and resources. See, for example, Construction Management, The Architect's Handbook of Professional Practice, Robert C. Mutchler and Christopher R. Widener, 13th edition, 2000, The American Institute of Architects for additional discussion.

When analyzing financial costs, risks and rewards in a construction project, principal actors include the bank, an insurance company, a construction bonding agent, a contractor/builder, and an insurance inspector.

Construction insurances are required on every large construction project. Construction insurances can provide coverage for material, risks, natural disasters and employees. A construction bond minimizes the financial risk faced by project owners and developers in the construction industry. The bond is similar to an insurance policy, but actually goes a step further to provide a legal guarantee. The construction bond, a type of surety bond, guarantees that the contractor holding the bond will perform a specified obligation or face financial penalties. It can protect, for example, against an adverse event that causes disruptions, failure to complete the project due to insolvency of the builder(s), or the job's failure to meet contract specifications. Surety companies will evaluate the financial merits of the principal builder and charge a premium according to their calculated likelihood that an adverse event will occur. The price of the bond generally depends on factors such as the type of work performed and the risks associated with the work. Contractors are typically required to purchase surety construction bonds.

The surety promises the obligee that the contractor will do the work as agreed. He agrees to takes responsibility if the contractor fails to keep to the terms of the contract by compensating the obligee monetarily, up to an agreed-upon certain sum. The surety wants compensation for assuming the risk involved in the contract, and the contractor needs to pay for the bond. The construction bonding agent becomes responsible for carrying out the work or paying for the loss up to the bond "penalty" if the contractor fails to perform.

The complexity and associated risk in the financial management of construction projects continues to increase due to, for example, tightened construction schedules, just-in-time inventory paradigms, and increased labor costs. Although progress has been made in the traditional mechanics of construction project management, little advancement has been made in managing or even structuring the relationships between the principal actors involved in driving the significant financial costs, risks and rewards in a construction project. In an effort to provide comprehensive management of a construction project so as to minimize construction costs and/or financial risks, it is highly desirable to comprehensively manage the allocation of financial resources, risks, incentives and interactions of the construction project financial actors involved, to include the bank, the insurance company, the construction bonding agent, the contractor/builder, and the insurance inspector. What is needed is a comprehensive system and method of monitoring activities that impact construction project cost, assessing possible actions to mitigate the impact of such activities or stop them, and executing recommended actions by providing the construction project financial actors with timely and relevant information and empowering them to take action.

Traditional approaches to the management of a construction project have focused on a single or limited set of interactions between construction project actors and/or have not provided an aligned or consistent set of goals or incentives to the disparate actors involved. Most effort has focused on traditional mechanics of project management or limited portions of construction management, such as construction cost estimating, the construction bidding process, electronic means to gather and distribute project construction data, and electronic management of construction requirements.

For example, U.S. Patent Application Publication No. 2005/0261930 published to Litz ("Litz") provides a method and system for construction estimating. The method includes the steps of: (a) compiling construction activity data in a database, (b) categorizing the data in the database according to construction related parameters, and (c) employing a database analysis and reporting system to construction estimating. A comprehensive and organized construction-estimating database for construction estimating professionals, construction service business owners, and for suppliers of general contractors, construction managers, construction developers and architects is provided. Litz is incorporated herein by reference in its entirety.

U.S. Pat. No. 7,330,821 to Wares ("Wares") provides an integrated electronic commerce based construction industry bidding and project management system and method, including document distribution, supply chain automation and on-line auctioning. In a pre-construction setting, the e-commerce based bidding and project management system and method provides for a user the means for participating and competing in the bidding and construction project management tasks using on-line computerized telecommunications technologies. The on-line system and methodologies help the participants to achieve cost efficiencies and performance enhancements that traditional manual bidding and construction management systems and methods have not achieved. In a global system setting the Wares system and method facilitates management of real estate, development, building and construction industries, including architecture, engineering and construction (AEC) project phases, including design, specification, research, bidding, financing, procurement, construction, and maintenance. Wares is incorporated by reference in its entirety.

U.S. Pat. Pub. No. 2006/0015475 published to Birkner ("Birkner") provides a construction management system comprising a handheld computer adapted to collect construction data including an inspection checklist from the field; a planning system to track budgetary information; a design system to perform site engineering assessment; and a construction system to track material consumption and progress for each project, the construction system adapted to receive data collected from the handheld computer. Birkner is incorporated by reference in its entirety.

U.S. Pat. Pub. No. 2007/0005412 published to Martinez ("Martinez") provides a construction management system comprising a handheld computer adapted to collect construction data from the field and to check field work with a checklist using the handheld computer. Construction item specifications outline workmanship and testing requirements. The use of a predetermined checklist facilitates and provides consistency to the workmanship inspection and audit activities. The use of the handheld computer with predetermined sampling and testing reports simplifies and improves the accuracy and efficiency of material testing activities. The checklist operations include selecting an item to be checked from a menu of construction items and formulating into required questions; providing electronic checklists; entering one or more key fields for an item and inspector name; locating information for certain fields based on key fields and automatically filling the fields; displaying a sequence of questions and collecting answers relating to a checklist for the item; capturing a signature from an inspector; and uploading the checklist information to a server. Martinez is incorporated by reference in its entirety.

U.S. Pat. Pub. No. 2010/0173582 published to Han ("Han") provides a real-time construction productivity analyzing apparatus and method using an RFID based on wireless communication. The apparatus and method can provide a systematic construction management system through the real-time productivity analysis and the real-time monitoring for each process of the construction field, and can detect a productivity-reducing factor in real time by integrating IT fields such as wireless communication technology and RFID technology, so that the near target productivity can be achieved by prompt treatment. The real-time construction productivity analyzing apparatus includes: an RFID tag including an ID code for identification of each equipment for construction work and attached to each equipment; a tag data management device for reading the ID code of the RFID tag in order to check a cycle time of each equipment in each process of the construction work, integrating the read time and position of the RFID tag and the ID code data of the RFID tag, and transmitting the integrated data; a central server for receiving the time and position data and the ID code of the RFID tag from the tag data management device and updating the data in real time to monitor the productivity in real time; and a database for storing the pre-stored data and the real-time input data of the central server. Han is incorporated by reference in its entirety.

Toward improved management of the financial drivers of construction management, U.S. Pat. No. 7,711,584 to Helitzer ("Helitzer I") and U.S. Pat. No. 8,271,303 to Helitzer ("Helitzer II") provide a method and computerized system for managing the underwriting, quoting and binding of an insurance policy with regard to the technology used to militate against the financial consequences of property losses. The system utilizes a classifier for categorizing and weighing risk, composed of data represented in an identified building, a first unmitigated insurance risk and a second insurance risk, based upon the use of certain technology. A plurality of the weights are summed such that the weights generate a minimized risk for a building structure under consideration and permit an underwriter to establish a premium. In another aspect of the invention, data structures representing the quantification of risk reduction attendant a given technology or product are chained into a plurality of decision trees that process a construction phase and a pruning phase. Helitzer I and Helitzer II are incorporated by reference in their entireties.

By way of providing additional background, context, and to further satisfy the written description requirements of 35 U.S.C. §112 with respect to the embodiment of the invention regarding a system and method for comprehensive construction management, the following references are incorporated by reference in their entireties for the express purpose of explaining the nature of the construction management processes and methods to further describe the various systems, sub-systems, tools and components commonly associated therewith: U.S. Pat. Pub. No. 2009/0048899 published to Bender on Feb. 19, 2009 and U.S. Pat. No. 7,899,739 to Allin.

By way of example to illustrate the embodiment of the invention in which the system and method for management and minimization of insurance loss is applied to comprehensive construction management, the following example is provided. Consider a scenario in which a construction Project involves principal construction project financial actors of a Bank or similar financial institution, an Insurance Company, a construction Bonding Agent, a general Contractor or builder, and an Insurance Inspector.

Typically, each of these actors are provided defined and limited roles and responsibilities in the construction process, and collect and share defined and limited project information that impact risk and/or costs. For example, the Contractor may share data regarding the timeliness and costs of material required for a particular phase of a project with the Bank, so as to ensure timely payment to the Contractor's suppliers or to seek additional finances from the Bank due to an unexpected rise in the price of a construction commodity such as wood. In contrast, the Bonding Agent typically has little to no insight into the performance of the Contractor and traditionally has limited to no leverage against the Contractor to perform his obligations per the terms of the construction bond, resulting in the Bonding Agent feeling very financially exposed (as a failure of the Contractor to perform triggers payment of the bond penalty by the Bonding Agent) with essentially no control of his destiny.

Before the construction Project begins (and likely during contract negotiations), akin to a "pre-incident" or "pre-peril" scenario of previously-discussed embodiments of the System, each of the afore-mentioned principal construction project Financial Actors (i.e. Bank, Insurance Company, Bonding Agent, Contractor and Insurance Inspector) agree to implement and follow the System and method of the invention which comprises the Surveillance and Monitoring Module (SMM), the Action Assessment Module (AAM), and the Action Execution Module (AEM). More specifically, the Insurance Company would contractually require that all Financial Actors implement the System as a condition of coverage. The Contractor would only receive insurance coverage and meet requirements for bonding and loans if they implement the System. The Bank as well as the Bonding Agent would similarly only be eligible for and only receive a funding contract or bonding contract, respectively, if they implemented the System. Finally, the Insurance Inspector would be required to monitor Project performance and compliance with insurance terms and conditions using the System. In this way, each of the Financial Actors are providing and sharing Project data in a unified and comprehensive manner, resulting in improved financial control and minimized risk. In addition or as a replacement for requiring the use of the System by a particular Financial Actor, incentives could be provided to implement the System, such as listing a particular Bonding Agent as a preferred bonding agent and providing them a 10% discount on their required bonding coverage.

In the above pre-incident temporal context, here before construction even begins, benefits would accrue. For example, a common problem in construction Projects is the theft or loss of construction equipment, such as construction-grade power generators or cooper wiring. With the System as implemented above, requirements for lock-down and securing of power generators are put in place, and procedures established that require the Contractor to "check-in" or report the status of each power generator periodically during the work hours and perhaps via a night guard during off-work evening hours. Such status data may be collected through any of several means known to those skilled in the art, to include via use of Radio-Frequency Identification (RFID) tags affixed to the power generators and RFID readers and broadcasters fitted to a portable device, such as a smart phone (e.g. iPhone, iPad). These status data are immediately shared with all Financial Actors, allowing decreased risk of theft because, for example, any missed report or errant report has higher likelihood of corrective action given more stakeholders are aware of the missed or errant report. These status data are received and processed in the Surveillance and Monitoring Module (SMM) of the System. Similarly, once the construction Project begins, akin to a "during peril" or damage mitigation scenario of previously-discussed embodiments of the System, several benefits could accrue. In the situation just described, for example, a missed report might trigger an alarm or notice to a watchman to immediately investigate the power generator at issue, so as to perhaps prevent the theft (and thereby vitiate the subsequent project delay or disruption caused by the loss of a power generator). Here, the missed report would be analyzed in the Action Assessment Module (AAM) to, for example, assess its validity (i.e. was the status report missed due to a communication glitch or was it to be provided by a guard who called in sick that evening, thereby casting doubt that the missed report translates to a stolen power generator). If the AAM determines that an action is required (e.g. an alarm), such a recommended action is provided to the Action Execution Module (AEM) for execution.

The temporal aspect of the System could also be viewed from a per incident perspective, rather than by the before, during and after construction perspective. For example, the "incident" or "peril" could be defined as the missed delivery of a critical path item to the construction project, for example the delivery of air conditioning (AC) units to the job site. Once the incident of the missed delivery occurs (as determined by the Surveillance and Monitoring Module), post-incident activities occur among the Financial Actors. Such post-incident activities would be assisted by the Action Assessment Module, which may, for example, provide predictive information as to when the missed AC unit will arrive. Empowered by the data of the System as gathered by the SMM and assessed by the AAM, the Insurance Inspector would be able to more expeditiously physically investigate the circumstances of the delay to determine if the broader impact of the delay to the larger construction project is minimal, e.g. a few days, or quite significant, e.g. several weeks, and so inform the other Financial Actors. In this scenario, if the delay is deemed significant so as to put at risk timely project completion and/or Contractor performance to a critical milestone (e.g. all HVAC on-line by a certain date), the Bonding Agent and Bank may enter negotiations to adjust the terms of the Bonding Agent's surety agreement so as to adjust the bonded Contractor performance. In such a way, financial risk is more manageable as it is becomes more predictable through, among other things, the sharing of construction project information among the Financial Actors.

This scenario also has potential to align interest and/or incentives of the actors involved. For example, in the above missed AC unit delivery scenario, the Bonding Agent is motivated to minimize any surety penalty he may have to pay to the Bank as a result of Contractor missed or delayed performance. The Bonding Agent also wants predictability in his financial risk portfolio, so is motivated to "settle" any potential surety penalties that might arise. The Bank is motivated to keep the construction project on schedule so as to recover its loan based on an occupancy date or operational date for the construction project. As such, both the Bonding Agent and the Bank benefit by the timely, accurate and complete data as provided by the System.

As illustrated in various figures in the present application, flowcharts provide a general description of the numerous method steps that may be employed to accomplish one or more of the aspects of the present invention. For example, one aspect of many embodiments of the present invention involve the ability of an insurance company to reserve particular desired services that may be particularly needed after a catastrophic event. As such, the insurance company prearranges with demolition services, car repair services, house repair services, flood abatement services, window replacement services, etc., such that a predetermined percentage of the service providers' capability (or so-called bandwidth) is reserved for the insurance carrier's access in the event of a catastrophic event. In a particular example, a roofing company may agree that 10% of its service capabilities are reserved to State Farm Insurance Company in the event of a hail damage claims being made after any particular hail storm. In exchange for agreeing to reserve such percentage of capable work force and materials, the insurance company pays a predetermined negotiated amount with the roofing company on, for example, a quarterly or yearly basis. In the event of a catastrophic hail storm, however, State Farm is assured that it can provide its policyholders with ready access to needed roof repair services.

In yet other embodiments of the invention, especially when a policyholder signs up for a particular program with an insurance company whereby if the policyholder confirms the insurance company's pre-notification to the policyholder of an imminent potential catastrophic event, the policyholder is entitled to a particular perk, such as a reduction in future premiums by a certain percentage (e.g., 10% off the next year's premiums); preferential access to service providers that the insurance company prearranged access to services for its policyholders; preferential rates on combined coverage for house, auto, life, disability, etc. In such a manner, the insurance company provides a monetary benefit to its policyholders in exchange and consideration for the policyholder's provision to the insurance company of valuable information, such as confirmation that the insurance company's contacts to the policyholder prior to a catastrophic event were received and/or acted upon by the policyholder. Thus, for example, if an insurance company contacts via email its policyholders in a particular area where a hail storm is predicted to be imminent, informing all such policyholders to store their automobiles protected under the policy within a covered enclosure, such as a garage, and the policyholder responds via a confirming email that it has moved its vehicles into a protected area, the insurance company is benefited by alleviating costly claims for damage that may be otherwise by the hail storm. The incentive on the policyholder's side is that its premiums may be reduced and/or one or more of the above-referenced benefits may be made available to the policyholder in consideration for such cooperative conduct. Moreover, the policyholder is obviously benefited by pre-warning of an imminent catastrophic event that would cause damage to the policyholder's personal belongings (e.g., vehicle) and is thankful to the insurance company for taking the initiative to forewarn the policy of the catastrophic event and the consequential potential damages that may ensue therefrom.

As one will appreciate, the recent advances in technology largely facilitate the types of communications that undergird many aspects of the present invention. For example, the ubiquity of policyholders having immediately assess to Smart phones (e.g. iPhone), emails, text messaging, telephone communications, visual and pictorial representations of before and after events and the condition of insured properties, greatly facilitate the preferred communication exchange between policyholder and insurance company in a manner that qualitatively changes the business models of traditional insurance coverage paradigms.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

As one will appreciate, one aspect of various embodiments of the present invention involve an agreement by the policyholder to communicate in a far more extensive, prompt and substantive manner with the insurance company as to how best to protect insured property prior to and/or during the catastrophic event at issue. Heretofore, there has been no financial incentive for any policyholder to make contact with their insurance agent or insurance company just prior to a catastrophic event. By providing such a financial incentive, both the insurance company and the policyholder are better served and, given the vast scale of the insurance industry, tremendous amounts of money, capital and resources are better directed to serve the legitimate replacement and rehabilitation needs of damage insured properties.

Communications means and protocols may include any known to those skilled in the art, to include cellular telephony, internet and other data network means such as satellite communications and local area networks. As examples, the cellular telephony can comprise a GSM, CDMA, FDMA and/or analog cellular telephony transceiver capable of supporting voice, multimedia and/or data transfers over a cellular network. Alternatively or in addition, other wireless communications means may comprise a Wi-Fi, BLUETOOTH™, WiMax, infrared, or other wireless communications link to and from devices such as iPhones or other smartphones and iPads. Cellular telephony and the other wireless communications can each be associated with a shared or a dedicated antenna. Data input/output and associated ports may be included to support communications over wired networks or links, for example with other communication devices, server devices, and/or peripheral devices. Examples of input/output means include an Ethernet port, a Universal Serial Bus (USB) port, Institute of Electrical and Electronics Engineers (IEEE) 1394, or other interface. Communications between various components can be carried by one or more buses.

Computer processing may include any known to those skilled in the art, to include desktop personal computers, laptops, mainframe computers, mobile devices and other computational devices.

Static policy holder data may include that data known to those skilled in the art. For example, U.S. Pat. No. 4,491,725 issued to Pritchard on Jan. 1, 1985 ("Pritchard") describes a medical claim verification and processing system that reads a medical information card (MEDICARD) to determine a patient's background medical and insurance information. A local service provider enters into a local terminal the medical and MEDICARD information services provided or to be provided to the patient by using a patient service code and transmits this information to a central brokerage computer. The central brokerage computer converts the patient service code input by the service provider or MEDICARD into a particular service code for the patient's insurance carrier. This service code is then utilized to determine the insurance claim payment for that particular patient service. The claim payment amount for the medical service is then transmitted back to the local entry terminal for use by the service provider and patient. The service provider and patient can then determine the amount of payment which will be made for the particular insurance claim. The provider can then prepare an electronic claim form and, together with the patient's and/or the provider's determination whether or not the assignment provision of the insurance claim will be invoked, the electronic claim form is then transmitted to a central brokerage computer which in turn transmits the claim form to the appropriate insurance carrier. The patient's insurance carrier processes the claim form, and, based upon the assignment decision, transfers the payment check to the patient or makes an electronic funds transfer to an account for the service provider, the patient or a central brokerage computer. Pritchard is incorporated herein by reference in its entirety.

Insured policyholder compliance with a directive (from, for example, a claims center or insurance agent) may be by any of several means known to those skilled in the art. For example, U.S. Pat. Pub. No. US 2008/0262883 published to Weiss et al. on Oct. 23, 2008 ("Weiss") teaches systems and methods for compliance and announcement display and notification. Weiss is incorporated herein by reference in its entirety.

User interfaces for various stakeholders and/or participants may be by any of several means known to those skilled in the art. For example, U.S. Pat. No. 65,950,169 issued to Borghesi et al. on Sep. 7, 1999 ("Borghesi") teaches a system and method for managing and processing insurance claims that implements an object oriented graphic user interface. The system includes at least one remote computer for entering and viewing insurance claim information. A wide area network capable of communicating with the remote computer and a computer in communication with said wide area network are also included. An insurance datafile generated at the remote computer, is transferable over the network. The Borghesi method includes the steps of transmitting a claim assignment from an insurance office computer to a mailbox in a communications server, retrieving the assignment at a remote computer and generating an insurance claim datafile containing all data pertinent to an insurance claim and allowing for bidirectional transmission of the datafile over a wide area network. A graphic user interface for use in managing an insurance claim from an initial claim to final settlement is also included. The interface has common workflow objects such as an in box, an in process box, and an out box, for managing and manipulating one or more workfiles. Borghesi is incorporated herein by reference in its entirety.

In some aspects of the invention, relative or absolute location data are utilized. For example, if a specific warning is to be provided to a policyholder as to re-locate and/or secure a particular insured asset on a large physical property (e.g. a construction site or a ranch), accurate location data is required. These data may be provided in any format known to those skilled in the art, to include latitude/longitude coordinates, measures relative to a known or provided datum associated with specialized maps such as those provided by a local municipality, coordinates relative to U.S. government maps such as Digital Terrain Elevation Maps, commercial maps such as those provided by Google Earth™ and GeoEye™, and data provided by qualitative field reports to include specified distance from street intersections. The data source may include any of several types known to those skilled in the art, to include local field reports gathered by individuals, data gathered through automated means, and data gathered remotely. For example, data sources may include ground-based platforms (a.k.a. "geo platforms"), satellites, and aerial platforms such as airplanes, helicopters, and unmanned aerial vehicles to include remotely-operated or autonomous drones. Satellite data sources include optical satellites, radar satellites or other artificial satellites in earth orbit that can provide either passive or active data. These data may be geospatial point data, such as that provided by a government or commercially available GIS data provider. For example, the United States Geological Survey (USGS), National Aeronautics and Space Administration (NASA), or Defense Mapping Agency (DMA) could provide such data. Some of these data are provided free via internet sites. Other data sources, for example, from commercial Geographical Information System (GIS) sources (e.g. GeoEye™) require a service fee.

The software management architecture and means may be of any of several means known to those skilled in the art. For example, U.S. Pat. Pub. No. 2009/0030910 published to Bennett et al. on Jan. 29, 2009 ("Bennett") teaches a relational database system and method for electronically storing and managing data, documents, and files relating to individuals, properties, vehicles, pets, assets and corporate bodies to facilitate easy viewing, retrieval, organization and onward transmission of such information. The Bennett system enables a user to enter information into an intuitive relational database system on a once-only basis. Further, Bennett integrates on a user selectable two-way basis with third party suppliers, agencies, and computer programs. The system and method allow for centralized storage and then automated communication of a user's information for the purposes of receiving notifications of the lowest service provider quotes as well as sending notifications of emergency response, moving information, address updates, disaster recovery, and the like, from a single relational database system. Acceptance of such quotes may be automatic, and relevant documentation may thereafter be uploaded to the user's account for later search and review. Bennett is incorporated herein by reference in its entirety.

Methods of combining or integrating data sources toward decision making may be of any of several means known to those skilled in the art. For example, International Pub. No. WO 2010/091372 published to Sholer et al. on Aug. 12, 2010 ("Sholer"), pertaining to information security services, discloses outsourced bundles of services for responding to a compromise of information assets. The Sholer system main steps are: receiving a request, obtaining preliminary information about the compromise, dispatching one or more teams to respond, creating and updating a case file, advising the customer with response decisions, notifying relevant parties about the compromise, acquiring forensics data, referring an insurance professional, implementing a training program, isolating the compromised information asset(s), neutralizing the compromise, creating a risk assessment report, implementing security technologies, and implementing security processes. Sholer is incorporated herein by reference in its entirety.

Preparing and/or transforming data for use by the various modules and elements described herein may be of any of several means known to those skilled in the art. For example, U.S. Pat. Pub. No. 2012/0296676 published to Burgoon, Jr. on Nov. 22, 2012 ("Burgoon") teaches the transformation of disparate data for use in rendering a decision involving a potentially insurable risk. An Extract, Transform, Load (ETL) process extracts the data and converts it from a plurality of formats into a standard format for processing. A heuristic engine inferentially processes the converted data to identify information relevant to the decision to be rendered. A consolidation and presentation engine generates presentable knowledge from the relevant information and then presents the knowledge to a decision-making entity for rendering the decision. And an optimization feedback process monitors one or more actions on the presented knowledge by the decision-making entity and adjusts one or more of the ETL process, the heuristic engine, and the consolidation and presentation engine as a function of the monitored actions. Burgoon is incorporated herein by reference in its entirety.

This Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the invention and, together with the general description of the invention given above and the detailed description of the drawings given below, serve to explain the principals of this invention.

It should be understood that in certain instances, details that are not necessary for an understanding of the disclosure or that render other details difficult to perceive may have been omitted. Further, the drawings of the system and/or method do not detail all features of the system and/or method, and do not show the entire system and/or method. It should be understood, of course, that the disclosure is not necessarily limited to the particular embodiments illustrated herein.

DETAILED DESCRIPTION

Figure 1:
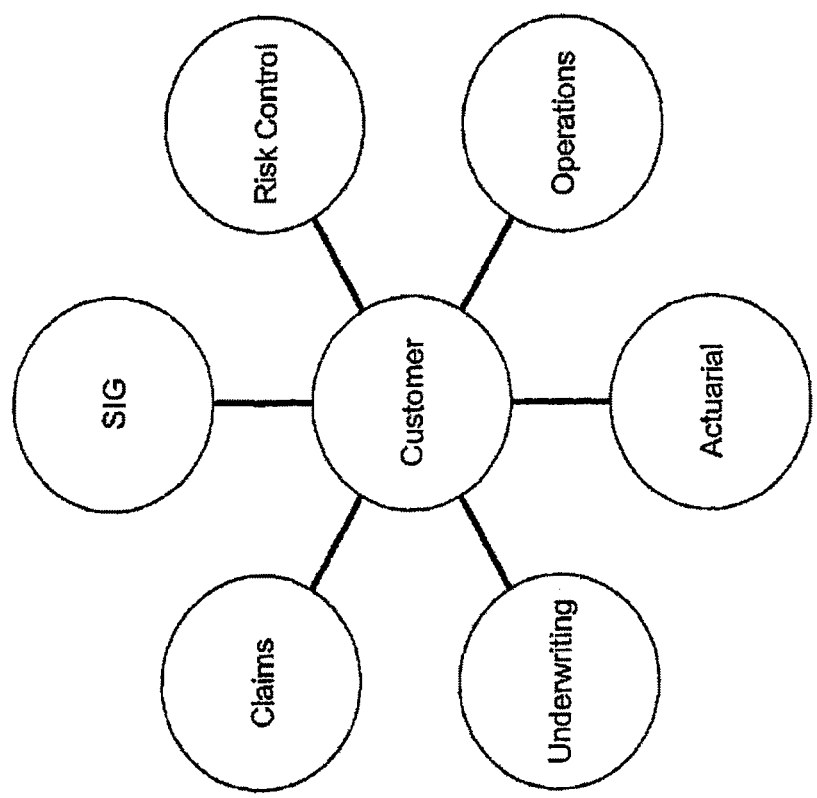
FIG. 1 is a block diagram depicting a customer centralized insurance loss system in accordance with embodiments of the prior art.

FIG. 1 provides a block diagram depicting a traditional customer centralized insurance loss system in accordance with embodiments of the prior art. In such a system, the customer is burdened with managing insurance activities, such as risk control before and after an incident, and managing the claim process, such as engaging repair contractors.

Figure 2:
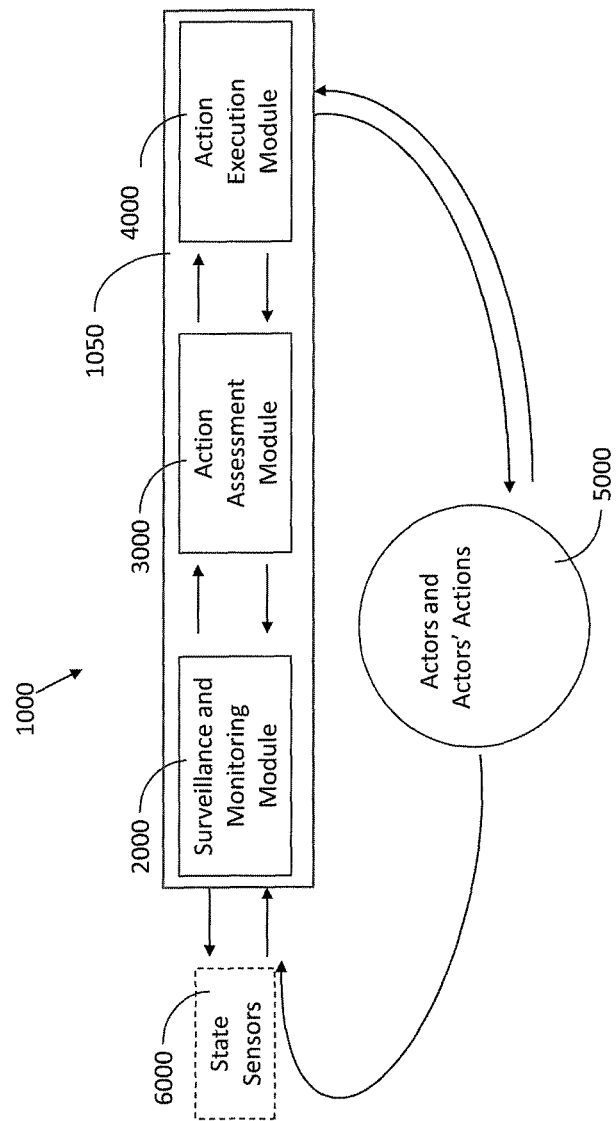
FIG. 2 is a block diagram depicting the insurance loss system in accordance with embodiments of the present invention.

FIG. 2 provides a block diagram of the system depicting the interactions of modules, sensors, and actors in accordance with embodiments of the present invention.

The insurance loss system 1000 is depicted with modules Surveillance and Monitoring Module (SMM) 2000, Action Assessment Module (AAM) 3000 and Action Execution Module (AEM) 4000. State sensors 6000 (not part of the invention) are also depicted, and an Actors and Actors' Actions (AAA) component 5000.

The State Sensors 6000 include a variety of data describing the state of possible insurance perils and insured assets of interest. For example, the state sensors 6000 may monitor and/or acquire weather data, either independently or from external sources such as the National Weather Service. Also, for example, the state sensors may acquire positional data as to insured assets, for example a policyholder's insured vehicle, by, for example, positional data broadcast by the insured vehicle. The data acquired by the state sensors 6000 is provided or communicated to the Surveillance and Monitoring Module 2000. Perils of interest include those that place an insured policyholder or asset at increased risk, such as perils due to weather, natural disasters or catastrophes, fire or smoke, crime such as theft or fraud, water damage, and mechanical or electrical problem.

In one embodiment, potential and/or actual perils are selected from the group consisting of hurricanes, ice storms, thunderstorms, high winds, tornadoes, storm surges, floods, tsunamis, earthquakes, hail storms, volcanic eruptions, fires, dust storms, and snow storms.

The Surveillance and Monitoring Module 2000 receives data from the State Sensors 6000 and also may transmit data to the State Sensors 6000. The data transmitted or provided to the State Sensors may include instructions for specific surveillance or monitoring, for example, a directive to acquire positional data as to a policyholder's insured vehicle. The Surveillance and Monitoring Module 2000 accepts data from the State Sensors 6000 and, among other things, performs data management and data integration to, for example, determine if additional data is required regarding a certain peril or insured asset and/or perform risk assessment as to perils identified and/or tracked.

The Action Assessment Module 3000 receives data from the Surveillance and Monitoring Module 2000 and processes that data, in combination with static data such as policyholder data and insured asset data, to determine if an action is required. If an action is required, the type of action is determined and such data is transmitted to the Action Execution Module 4000. For example, data received from the Surveillance and Monitoring Module 2000 may indicate a high likelihood of a peril, such as a hurricane, approaching a particular insured asset, such as a policyholder's vehicle, and, upon processing by the Action Assessment Module 3000, result in a determination that an action, such as contacting the policyholder to inform him of the peril and request that he relocate his vehicle, is required for execution by the Action Execution Module 4000. Also, the Action Assessment Module 3000, upon receipt and processing of data from the Surveillance and Monitoring Module 2000, may determine that additional data is required, and as such send a data request from the Action Assessment Module 3000 to the Surveillance and Monitoring Module 2000.

The Action Execution Module 4000 receives data from the Action Assessment Module 4000 and process that data, in combination with data such as the temporal posture of the peril at issue and the availability and character of actors involved to effect the action recommended. For example, if the peril is on-going, the Action Execution Module 4000 would likely seek to effect actions that would serve as so-called "damage mitigation" to reduce the harm and/or loss to the insured assets. Alternately, if the peril had passed, the Action Execution Module 4000 would likely seek to effect actions that would serve as so-called "incident management" to address the harm and/or loss to the insured assets. In any case, the Action Execution Module 4000 typically outputs data to the Actors and Actors' Actions 5000 to effect the recommended action. The Action Execution Module 400 may also transmit to the Action Assessment Module 3000 seeking additional information and/or processing by the Action Assessment Module 3000.

The Actors and Actors' Actions 5000 comprises the human actors and/or stakeholders involved in executing and/or managing the policyholder insured assets. The Actors and Actors' Actions 5000 receive data from the Action Execution Module 4000 and transmit data to the Action Execution Module 4000. For example, Actors and Actors' Actions 5000 may transmit data as to the status of effecting the desired action directed by the Action Execution Module 4000. The Actors and Actors' Actions 5000 also transmits data to the Surveillance and Monitoring Module 2000, for example, the physical positioning of one or more Actors and/or the status of an actor's performance in a tasked action.

The group of Surveillance and Monitoring Module 2000, Action Assessment Module 3000 and Action Execution Module 4000 are collectively grouped as System Hub 1050.

The components of System Hub 1050 may individually or collectively exchange data and/or interact with the Actors and Actors' Actions 5000.

Figure 3:
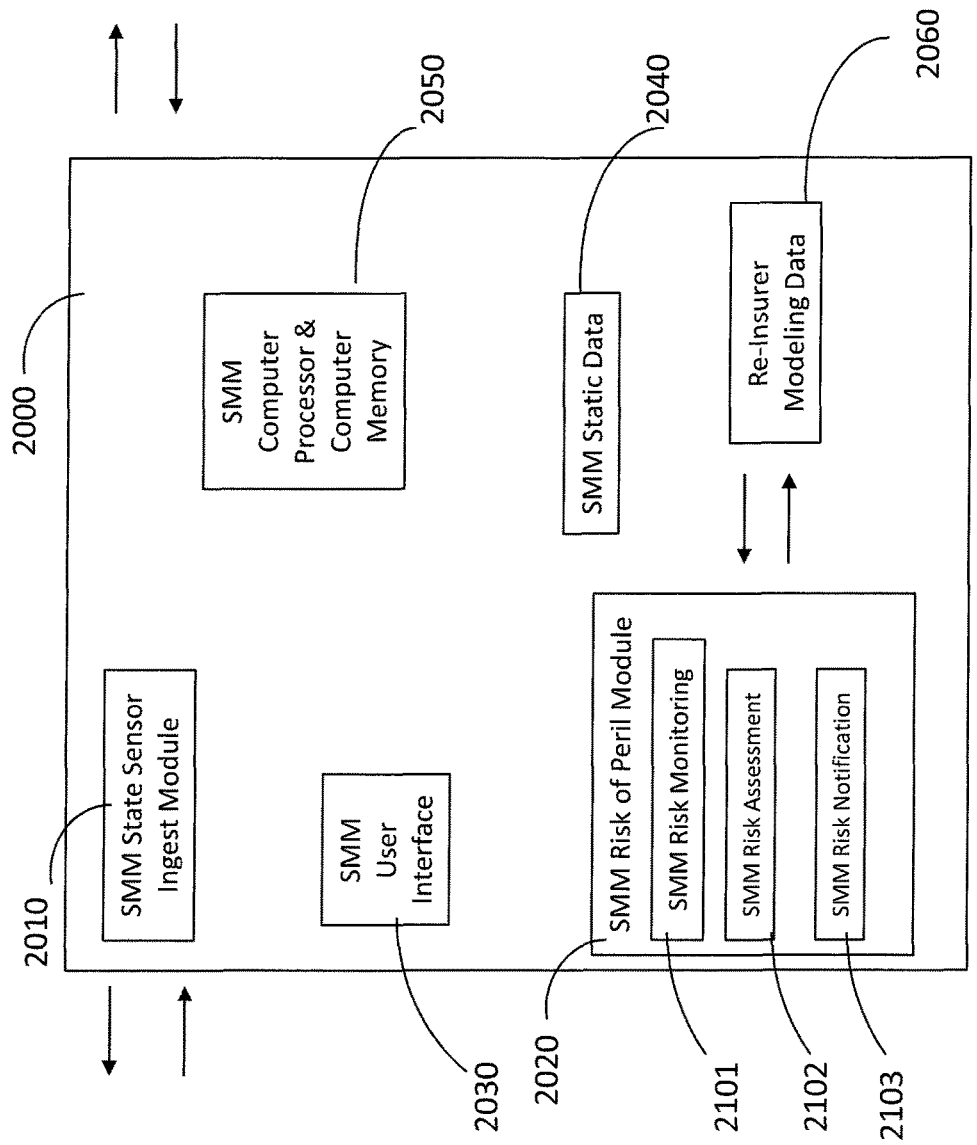
FIG. 3 is a block diagram depicting components of the Surveillance and Monitoring Module of the insurance loss system in accordance with embodiments of the present invention.

FIG. 3 depicts the Surveillance and Monitoring Module (SMM) 2000 of the insurance loss system 1000 in accordance with embodiments of the present invention. The Surveillance and Monitoring Module (SMM) 2000 comprises the SMM State Sensor Ingest Module 2010, the SMM Risk of Peril Module 2020, the SMM User Interface 2030, the SMM Static Data Module 2040 and the SMM Computer Processor & Computer Memory 2050. The SMM Risk of Peril Module 2020 comprises SMM Risk Monitoring 2101, SMM Risk Assessment 2102 and SMM Risk Notification 2103. The SMM Static Data Module 2040 may comprise policy holder data, insured asset data and geospatial data. In one embodiment, the SMM Risk of Peril Module 2020 interacts with Re-insurer Modeling Data, 2060. Re-insurer Modeling Data may comprise of data regarding probability of peril due to catastrophic events, natural disasters, weather, fire, theft, and any other causes of peril. Re-insurer Modeling Data may also comprise of risk management models and loss mitigation models.

Figure 4:
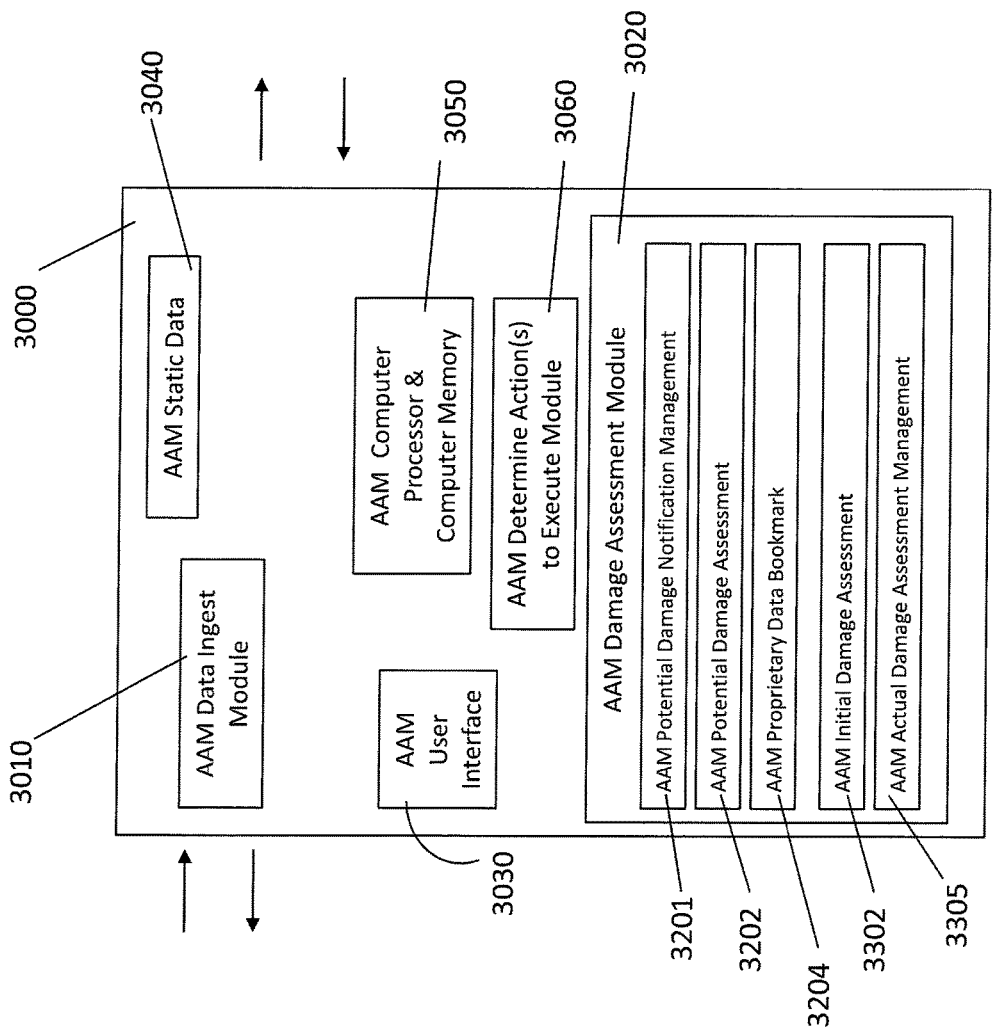
FIG. 4 is a block diagram depicting components of the Action Assessment Module of the insurance loss system in accordance with embodiments of the present invention.

FIG. 4 is a block diagram depicting components of the Action Assessment Module of the insurance loss system 1000 in accordance with embodiments of the present invention. The Action Assessment Module (AAM) 3000 comprises the AAM Data Ingest Module 3010) AAM Damage Assessment Module 3020, AAM User Interface 3030, AAM Static Data 3040, AAM Computer Processor & Computer Memory 3050 and AAM Determine Action(s) to Execute Module 3060. The AAM Static Data 3040 may comprise thresholds for action, options available and Policy Holder data. The AAM Damage Assessment Module 3020 comprises AAM Potential Damage Notification Management 3201, AAM Potential Damage Assessment 3202, AAM Proprietary Data Bookmark 3204, AAM Initial Damage Assessment 3302 and AAM Actual Damage Assessment Management 3305.

Figure 5:
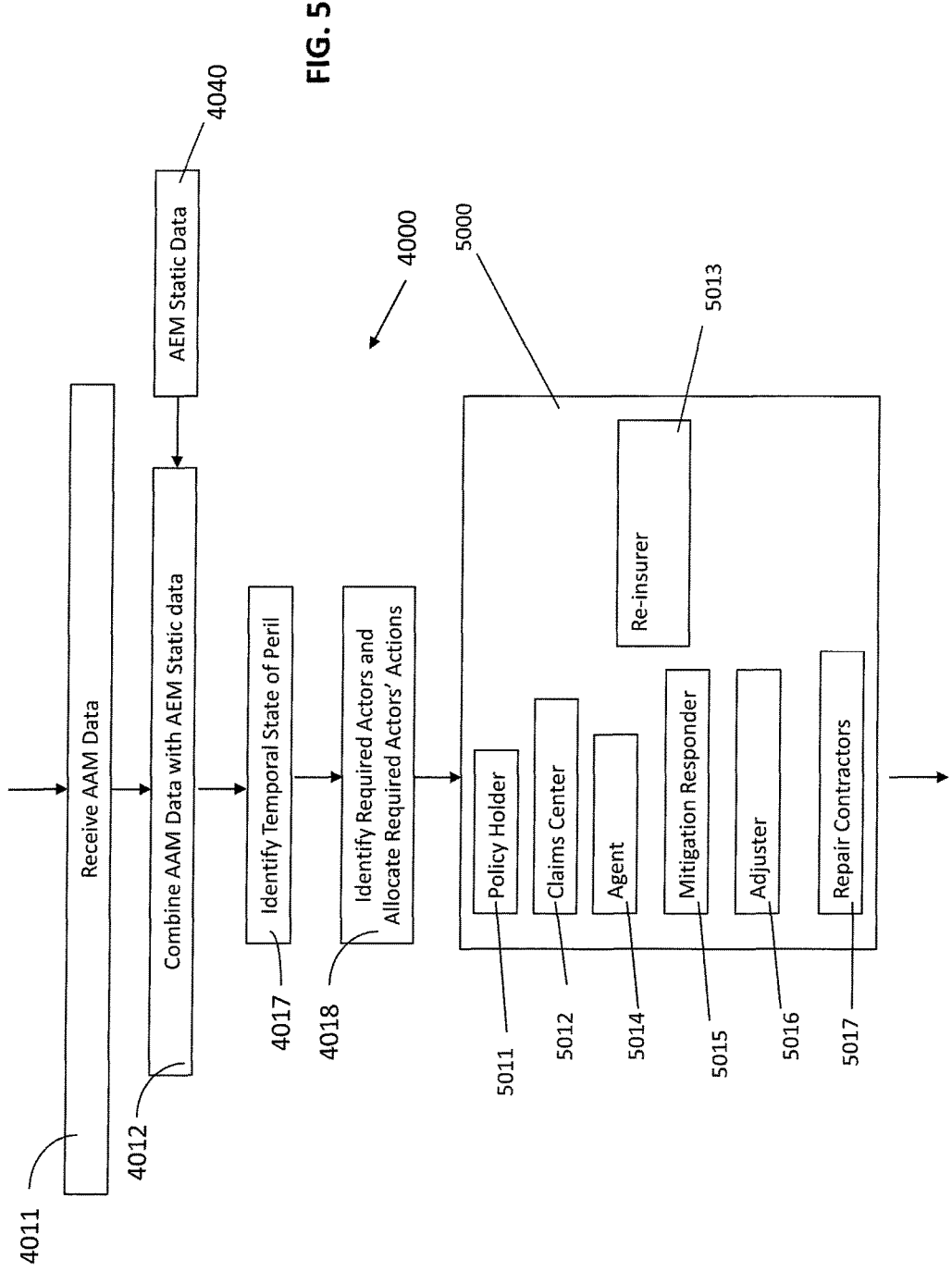
FIG. 5 is a flow chart depicting a method of allocating required actors' actions in accordance with embodiments of the present invention.

FIG. 5 is a flow chart depicting a method of allocating required actors' actions in accordance with embodiments of the present invention. The method of FIG. 5B would typically be performed within the Action Execution Module 4000. However, it could also be distributed within elements of the System Hub 1050. Data from the Action Assessment Module (AAM) 3000 is received (step 4011). The data received at step 4011 comprises, for example, the temporal nature of peril and the action sought for execution. The AAM data is then combined at step 4012 with AEM static data of the AEM Static Data module 4040. The AEM Static Data 4040 may comprise data involving actors and/or actors' actions available. After the data combination step 4012, the temporal state of peril, comprising before, during and after, is identified at step 4017. Required actors for action are then identified and required actions of those actors are allocated (step 4018). The appropriate actors are then contacted for execution of appropriate actions, shown in FIG. 5B as engagement with the Actors and Actors' Actions 5000 component.

Figure 6:
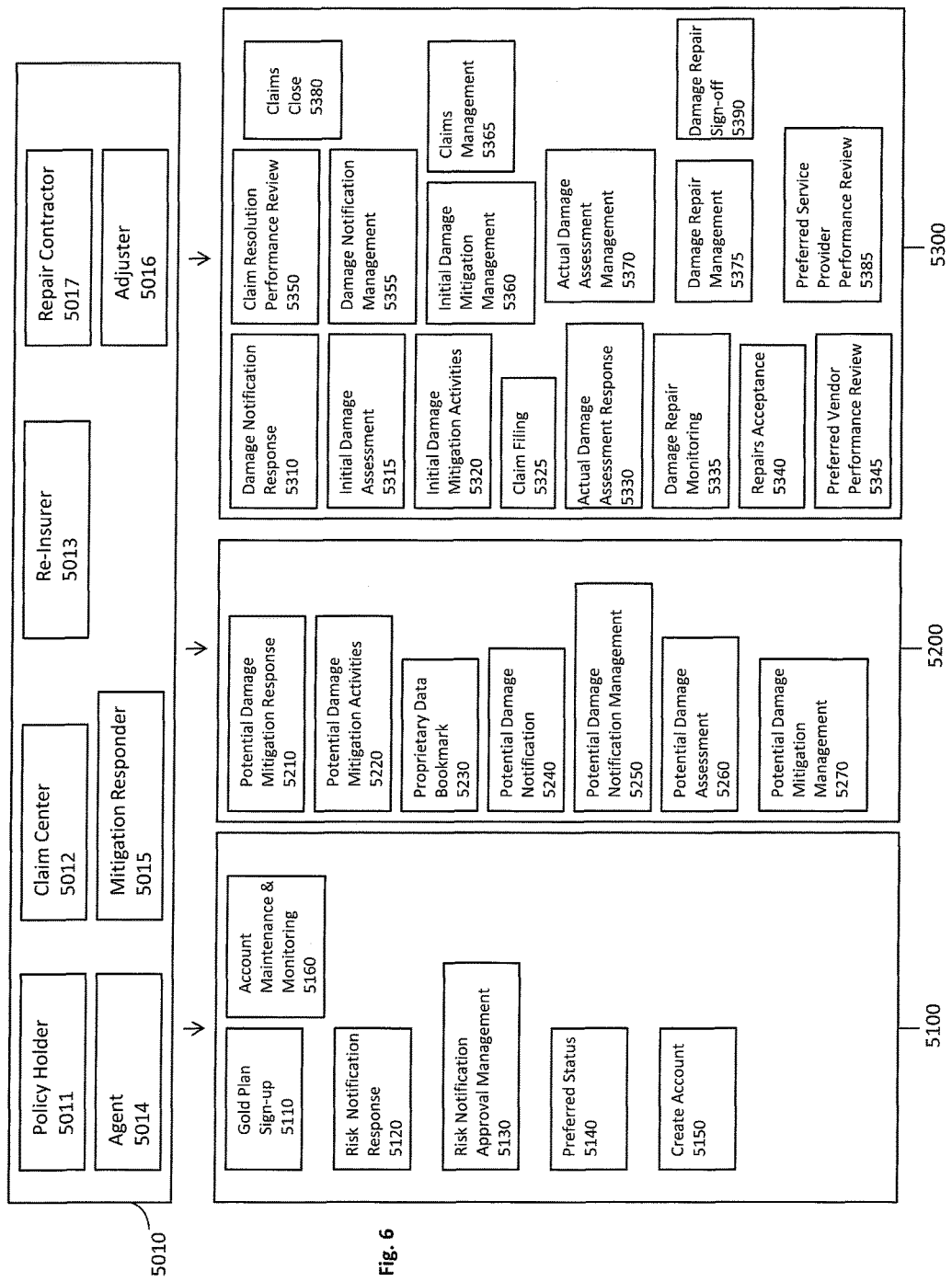
FIG. 6 is a block diagram depicting components of the actors and actions in different temporal states of peril in accordance with embodiments of the present invention.

FIG. 6 is a block diagram depicting components of the Actor's actions associated with embodiments of the present invention. The components of 5010 are associated with the Actors' actions Before Temporal State of Peril 5100, During Temporal State of Peril 5200, and After Temporal State of Peril 5300. The Actors in certain embodiments comprise Policyholders 5011 ("PH"), Claim Center 5012 ("CC"), Re-insurer 5013 ("RI"), Agent 5014, Mitigation Responder 5015 ("MR"), Adjuster 5016, and Repair Contractor 5017 ("RC").

Components associated with module Before Temporal State of Peril 5100 comprise: Gold-Plan Sign-up 5110, Risk Notification Response 5120, Risk Notification Approval Management 5130, Preferred Status 5140, Create Account 5150, Account Maintenance and Monitoring 5160.

Components associated with During Temporal State of Peril 5200 comprise Potential Damage Mitigation Response 5210, Potential Damage Mitigation Activities 5220, Proprietary Data Bookmark 5230, Potential Damage Notification 5240, Potential Damage Notification Management 5250, Potential Damage Assessment 5260, Potential Damage Mitigation Management 5270.

Components associated with After Temporal State of Peril 5300 comprise Damage Notification Response 5310, Initial Damage Assessment 5315, Damage Mitigation Activities 5320, Claim Filing 5325, Actual Damage Assessment Response 5330, Damage Repair Monitoring 5335, Repairs Acceptance 5340, Preferred Vendor Performance Review 5345, Claim Resolution Performance Review 5350, Damage Notification Management 5355, Initial Damage Mitigation Management 5360, Claims Management 5365, Actual Damage Assessment Management 5370, Damage Repair Management 5375, Claims Close 5380, Preferred Service Provider Performance Review 5385, Damage Repair Sign-off 5390.

The group of Surveillance and Monitoring Module 2000, Action Assessment Module 3000 and Action Execution Module 4000 are collectively grouped as System Hub 1050. The components of System Hub 1050 may individually or collectively exchange data and/or interact with the Actors and Actors' Actions 5000. The components of the System Hub 1050 may be considered as those associated with a System Hub Temporal State of Peril: Before, System Hub Temporal State of Peril: During and System Hub Temporal State of Peril: After. Components associated with the System Hub Temporal State of Peril: Before comprise SMM Risk Monitoring 2101, SMM Risk Assessment 2102, SMM Risk Notification 2103, CC Preferred Service Provider Management 5313 and CC Preferred Vendor Management 5314. Components associated with the System Hub Temporal State of Peril: During comprise AEM Potential Damage Notification Module, AAM Potential Damage Notification Management 3201, AAM Potential Damage Assessment 3202, AEM Potential Damage Mitigation Management and AAM Proprietary Data Bookmark 3204. Components associated with the System Hub Temporal State of Peril: After comprise AEM Damage Notification Management, AAM Initial Damage Assessment 3302, AEM Initial Damage Mitigation Management, AEM Claims Management, AAM Actual Damage Assessment Management 3305, AEM Damage Repair Management, AEM Damage Repair Sign-Off and Claims Close, CC Preferred Service Provider Performance Review 5338, CC Preferred Vendor Performance Review 5339 and CC Claim Resolution Performance Review 5340, PH Preferred Vendor Performance Review 5238, PH Claim Resolution Performance Review 5239, Agent Preferred Vendor Performance Review 5438 and Agent Claim Resolution Performance Review 5439.

By way of example only, certain embodiments entail Policy Holder 5011, engaging in certain actions after peril has occurred, as depicted by System Hub Temporal State of Peril: After, component 5300. Policy Holder 5011 would provide a Damage Notification Response, component 5310. In a preferred embodiment, the Policy Holder would provide a Damage Notification Response within 120 minutes of receipt of the aforementioned notification. In a more preferred embodiment, the Policy Holder would provide a Damage Notification Response within 90 minutes of receipt of the aforementioned notification. In a most preferred embodiment, the Policy Holder would provide a Damage Notification Response within 60 minutes of receipt of the aforementioned notification. Policy Holder also engages in Initial Damage Assessment, component 5315, to determine the amount of damage caused by the perilous event. In preferred embodiments, Policy Holder would provide a report regarding the Initial Damage Assessment, including providing the report via a phone call, providing the report via text message, providing the report via email, and/or providing the report through an online web-based portal. Policy Holder 5011 would then engage in Initial Damage Mitigation Activities, component 5320. In preferred embodiments, Initial Damage Mitigation Activities includes those described above. Policy Holder 5011 would also file a claim, depicted by component 5325. Then, there would be Actual Damage Assessment Response, component 5330, Damage Repair Monitoring, component 5335 by the Policy Holder, related to the response. After satisfactory repairs, Policy Holder would then provide a Repairs Acceptance, component 5340. Policy Holder would also provide a Preferred Vendor Performance Review as an evaluation of the Mitigation Responder 5015, component 2308, and a Claim Resolution Performance Review of the Adjuster 5016. One aspect of the present embodiments deals with the timing of responses required to accomplish the overall objective tasks as described hereunder. For example, in the time sensitive areas at issue, the entire process is preferably accomplished with communications from at least the agent, policy holder and at least one other entity selected form the group consisting of: adjuster; roofer; repairman; furnace; plumber, etc.—being within 72 hours, more preferably within 48 hours and most preferably within 24 hours.

In this example related to after peril activities, Repair Contractor 5017 would engage in activities depicted by System Hub Temporal State of Peril: After, component 5300. Repair Contractor 5017 would receive a notification according to the present invention, such as Damage Notification Management, component 5355. Repair Contractor would provide a Damage Notification Response, component 5310. In a preferred embodiment, the Repair Contractor would provide a Damage Notification Response within 120 minutes of receipt of the aforementioned notification. In a more preferred embodiment, the Repair Contractor would provide a Damage Notification Response within 90 minutes of receipt of the aforementioned notification. In a most preferred embodiment, the Repair Contractor would provide a Damage Notification Response within 60 minutes of receipt of the aforementioned notification. The response includes a response via phone, a response via text, response via email, and/or response via an online web-based portal. Repair Contractor would then provide information regarding Damage Repair Management, component 5375. Repair Contractor provides information including the activities performed by Repair Contractor to repair the damage and/or status reports. This information includes providing information via phone, a response via text, response via email, and/or response via an online web-based portal. After damage from the perilous event has been repaired, there would be a Damage Repair Sign-Off, component 5390. The Damage Repair Sign-Off could be communicated through phone, text, email, or as a message on an online web-based portal. The Repair Contractor would then be notified of payment.

Continuing with the example regarding actions of actors after peril, Adjustor 5016 would receive Damage Notification Management. Damage Notification Response includes interaction with Agent 5014, and the Agent would reply to the Damage Notification Response, contacting the Adjustor via phone, a response via text, response via email, and/or response via an online web-based portal. In a preferred embodiment, the Adjustor would provide a Damage Notification Response within 120 minutes of receipt of the aforementioned notification. In a more preferred embodiment, the Adjustor would provide a Damage Notification Response within 90 minutes of receipt of the aforementioned notification. In a most preferred embodiment, the Adjustor would provide a Damage Notification Response within 60 minutes of receipt of the aforementioned notification. Adjustor would then engage in Claims Management, component 5365. This includes claims evaluation and/or receiving an assessment assigning schedule. Claims Management 5365 also includes Adjustor confirming the claim evaluation schedule, evaluating the claim, creating a formal report, and/or providing a claim evaluation report. In a preferred embodiment, the Adjustor would provide a final claim evaluation report within 90 days according to the Claims Management component. In a more preferred embodiment, the Adjustor would provide a final claim evaluation report within 60 days according to the claims management component. In a most preferred embodiment, the Adjustor would provide a final claim evaluation report within 30 days according to the Claims Management component.

The above example is not intended to limit the present invention, as the parameters described apply to timing of notifications between all actors unless noted otherwise. For example, in yet another embodiment, Claim Center 5012 could receive a Risk Notification Response from Policy Holder 5011 in System Hub Temporal State of Peril: Before, component 5100, as an early warning of peril. In this example, in a preferred embodiment, the Policy Holder would provide a Risk Notification Response within 120 minutes of receipt of the aforementioned notification. In a more preferred embodiment, the Policy Holder would provide a Risk Notification Response within 90 minutes of receipt of the aforementioned notification. In a most preferred embodiment, the Policy Holder would provide a Risk Notification Response within 60 minutes of receipt of the aforementioned notification.

In yet another embodiment of the invention, there is a synchronous notification sent to all actors that will be involved. The notification may include Risk Notification Response, Potential Damage Notification and/or Damage Notification Response. In a preferred embodiment, the actors would provide a response within 120 minutes of receipt of the aforementioned notification. In a more preferred embodiment, the actors would provide a response within 90 minutes of receipt of the aforementioned notification. In a most preferred embodiment, actors would provide response within 60 minutes of receipt of the aforementioned notification.

Although this scenario has reference use of online communications, other communications could be utilized as well, comprising land-line or cellular or satellite telephone, face-to-face communications between parties, texting, faxing and any other means of communications known to those skilled in the art.

Figure 7:
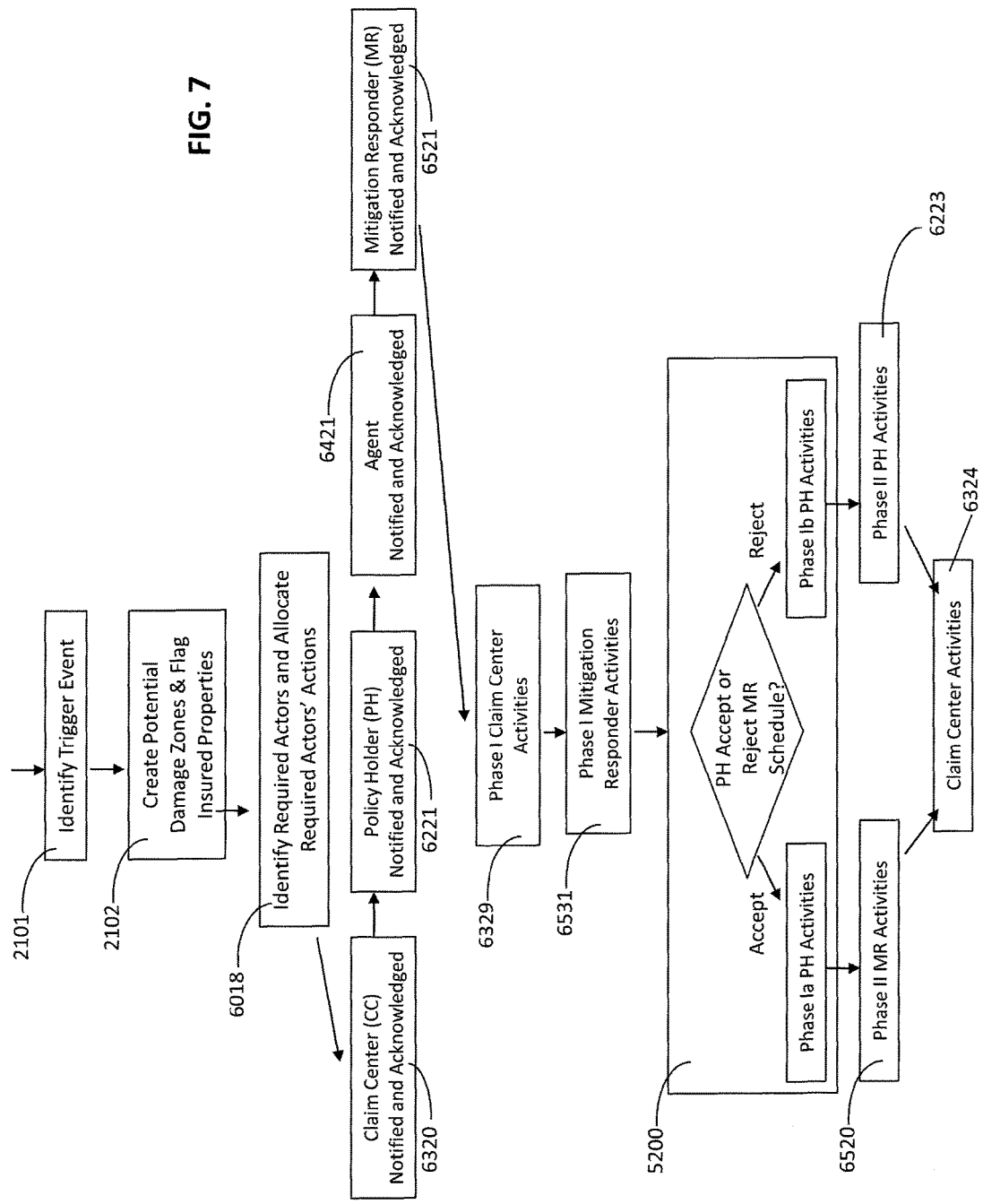
FIG. 7 is a flow chart depicting a method of creating potential damage zones upon a trigger event in a pre-incident scenario in accordance with embodiments of the present invention.

Regarding the method of creating potential damage zones upon a trigger event in a pre-incident scenario of FIG. 7, a trigger event is first identified. For example, the event may be a hurricane traveling up the northeastern seaboard region of the United States. This hurricane event will be used as a hypothetical scenario to provide additional insight into the method FIG. 7, but is not to be construed as limiting the method in any way. In the embodiment of FIG. 7, the identification of the trigger event step is conducted within the SMM Risk Monitoring Module 2101. In a preferred embodiment, sustained winds of greater than 29 mph are considered a trigger event. In a more preferred embodiment, winds greater than 31 mph are considered a trigger event. In a most preferred embodiment, sustained winds of greater than 35 mph are considered a trigger event. However, this step could also be distributed within elements of the System Hub 1050.

In other embodiments, trigger events may be set in accordance with guidelines and scales associated with peril. For example, certain embodiments may use the Saffir-Simpson Hurricane Wind Scale to determine trigger events. In this example, a preferred embodiment comprises a trigger event of a Category 3 hurricane according to the Saffir-Simpson Hurricane Wind Scale (sustained winds of 74-95 mph). A more preferred embodiment comprises a trigger event of a Category 4 hurricane according to the Saffir-Simpson Hurricane Wind Scale (sustained winds of 130-156 mph). A most preferred comprises a trigger event of a Category 5 hurricane according to the Saffir-Simpson Hurricane Wind Scale (sustained winds greater than 157 mph). The Saffir-Simpson Hurricane Wind Scale is only an example, and trigger events may be set using other criteria such as the Richter scale, etc.

Next, potential damage zones are identified and insured properties and/or assets are flagged. In the embodiment of FIG. 7, this step is accomplished within the SMM Risk Assessment 2102 component. However, this step could also be distributed within elements of the System Hub 1050. Required actors for action are then identified and required actions of those actors are allocated. The appropriate actors are then contacted for execution of appropriate actions. In the embodiment of FIG. 7, each of the claim center, policy holder, agent and mitigation responder are notified and provide acknowledgement of the trigger event and/or actions requested. In a preferred embodiment, each of the aforementioned actors are notified within 90 minutes of the identification of a trigger event. In a more preferred embodiment, each of the aforementioned actors are notified within 60 minutes of the identification of a trigger event. In a most preferred embodiment, each of the aforementioned actors are notified within 30 minutes of the identification of a trigger event. In FIG. 7, these steps are shown as consecutive components 6320, 6221, 6421 and 6521. For each of these identified actors, in addition to receiving notice of an event (here, a hurricane approaching and potentially impacting policyholder assets), each actors' actions comprise acknowledging the notice, selecting notification type, selecting notification method, selecting recipient and creating a custom message.

Continuing with the method of creating potential damage zones upon a trigger event in a pre-incident scenario of FIG. 7, after the appropriate actors are contacted for execution of appropriate actions as described above, Phase I claim center activities occur as within the CC Temporal State of Peril: During Module 6329. Specifically, components associated with the CC Temporal State of Peril: During 6329 comprising CC Potential Damage Notification Management 5250, CC Potential Damage Mitigation Management 5250 and CC Proprietary Data Bookmark 5230 are engaged. The CC Potential Damage Notification Management 5250, performs activities comprising weather data acquisition and satellite data acquisition, each of which require notification to the policyholder and agent via respective online accounts.

Next, as shown in FIG. 7, Phase I Mitigation Responder activities ensue. These activities are shown as being performed within the Mitigation Responder Potential Damage Notification Management 6521 element. However, these activities could also be distributed within elements of the System Hub 1050. The activities of the Mitigation Responder Potential Damage Notification Management 6521 comprise, schedule mitigation comprising notifying the policyholder, agent and claim center, respectively, via online account of schedule.

Continuing with the method of FIG. 7, the Policy Holder Temporal State of Peril: During 5200 component is next engaged. Here, the Policy Holder either accepts or rejects the mitigation responder schedule. The resulting activities of the policy holder are specific as to choice of accept (identified as Phase Ia Policy Holder activities in FIG. 7 or choice of decline (identified as Phase Ib activities in FIG. 7. Should the Policy Holder accept the mitigation responder schedule, then, as shown by FIG. 7, Phase II Mitigation Responder activities occur, as shown in FIG. 7 as those within the Mitigation Responder Temporal State of Peril: During 6520 module. In contrast, should the Policy Holder decline the mitigation responder schedule, then, as shown by FIG. 7, Phase II Policy Holder activities occur, as shown in FIG. 7 as those within the Policy Holder Potential Damage Mitigation Activities 6223.

The last step of FIG. 7 is that identified with CC Proprietary Data Bookmark 6324. These activities comprise notifying the policy holder, agent and mitigation responder of any proprietary bookmark, shown in this embodiment as via an online account.

Other embodiments of the present invention comprise providing a plurality of notifications as a forewarning to the same or multiple actors at separate times. For example, imagine an earthquake is detected off the coast of Japan. In preferred embodiments, Policy Holder would receive a notification of a potential Tsunami 48 hours before the Tsunami is expected to reach land. Policy Holder would receive another message 24 hours later, updating the Policy Holder regarding whether the Tsunami is expected to reach land and when it would reach land. Policy Holder would receive another message 12 hours later, updating the Policy Holder regarding whether the Tsunami is expected to reach land and when it is expected to reach land. Policy Holder would be required to provide a response to the notifications, in accordance with the preferred embodiments described. The notifications may provide an instruction to Policy Holder comprising, an instruction that Policy Holder should relocate assets to a particular area, an instruction that Policy Holder should take protective measures by securing assets in a safe off-site, an instruction that Policy Holder that assets that are likely to be most damaged by the particular type of peril should be protected, such as placing assets into a fireproof safe, and/or an instruction that Policy Holder should reinforce certain areas of a structure. The instruction may also include that the perilous event has passed or poses no threat, e.g., the Tsunami is not expected to reach land. This example of one particular actor to a particular type of peril is not intended as a limit, as the invention operates the same for the relevant actors and different types of peril.

Although this scenario has reference use of online communications, other communications could be utilized as well, comprising land-line or cellular or satellite telephone, face-to-face communications between parties, texting, faxing and any other means of communications known to those skilled in the art.

By way of example, but noting that such scenarios are only some of many possible scenarios, the following sets forth a situation tracing the life of an insurance claim from pre-peril, through peril and post-peril.

The Life of a Claim

Scene 1—Date: Monday, May 6

Time: Noon—CDT

Location: ABC Insurance Company—WECARE Monitoring Dept.

Stan the Storm Center technician is monitoring developing weather over the central Rocky Mountains. Using a vast array of weather information gleaned from various weather services, radar, satellite imagery, local weather stations, and weather spotters Stan notices that the precursors to the normal afternoon thunderstorm activity in the Denver metro area look more active and potentially more severe than normal.

ABC Ins. Co. has configured the system using the web portal tools to respond once certain thresholds have been reached. They were able to select which items were important to them and then set the trigger levels for each.

In this case they've decided that wind speeds in excess of 20 mph over certain weather stations, at this time of year, and at certain times of the day is one trigger.

Another is that humidity levels over 75% at certain weather stations, at this time of year, and at certain times of the day is a trigger.

An additional trigger is when quarter-inch sized hail is detected aloft via Doppler Radar.

They've also an alert rule to be when all three of the above have been triggered.

Time: 1 pm—CDT

Stan is convinced that severe weather for the Denver metro area is on the menu for today. He then notices that the present invention is recommending that an alert be sent out. Stan notifies his manager that he is in agreement in recommending that an alert be issued for the Denver metro area. His manager concurs and the present invention is instructed to issue the alert.

Time: 2 pm—CDT, 1 pm MDT

An alert is issued. The alert goes out via email, SMS text, MMS message, website, robo-phone call, Twitter, Facebook, etc. to all policy holders of ABC Company that have purchased the plan.

| Hail Warning | | | | | | |
|---|---|---|---|---|---|---|
| Time | Location | County | State | Lat | Lon | Comments |
| 1300 | DENVER | DENVER | CO | 39.7N | 104.8W | STRONG WINDS W/HAIL |

Mitigation Instructions:
1) Please confirm that you have received this message by answering the prompt on your phone, logging into your account online, or by calling 1-888-555-1212.
2) Move all of your vehicles to a safe, covered location.
3) Move any items that you can from the outside to under cover.
4) Ensure that all exterior doors and windows are closed and/or covered.
5) Please confirm that you have completed these steps by answering the prompt on your phone, logging into your account online, or by calling 1-888-555-1212.

Time: 2 pm—MDT

Location: Highlands Ranch, Colo., 123 Wild Horse Lane

Pete, an ABC Policy Holder, and a member, responds to item #1 of the text message that he received during his meeting, and was heading home to get ready to coach his son's baseball team, but now has cancelled practice and is planning what he needs to get secured for the impending storm. He can see the clouds building and rolling off the mountains to the west has he heads home.

Upon arriving home, Pete parks his car in the garage, then parks his wife's car in the garage. He pulls the stainless steel barbeque he got last year for Father's Day up under the porch roof of his deck. He then checks all exterior doors and windows and is now as ready as he can be. He confirms these steps as item #5 of the text message that he received earlier.

Time: 3 pm—MDT, 4 pm—CDT

Location: ABC Insurance—WECARE Monitoring Dept.

The system is now receiving confirmations from the policyholders in the Denver area. The policy holders that have not confirmed by now, are sent a follow up message reminding them that the storm is imminent and that as a condition of their coverage, they are to participate to the best of their abilities to the pre-storm mitigation activities. They are also offered the services of the preferred mitigation services providers if they are unable to perform the mitigation actions themselves.

Time: 4 pm—MDT

Location: Highlands Ranch, Colo., 123 Wild Horse Lane

It's raining and Pete hears the first indications of hail. He's watching out the window as the hail starts in force. He is upset that his newly leafy trees are getting shredded, but glad that he had not yet planted his flowers. He can hear the pounding that his roof is taking.

Time: 5 pm—MDT, 6 pm—CDT

Location: ABC Insurance—WECARE Monitoring Dept.

The WECARE center now sends out incident damage assessment messages via the above note methods to the members asking them for information as to the extent of any damages that they might have incurred.

Time: 5 pm—MDT

Location: Highlands Ranch, Colo., 123 Wild Horse Lane

Pete receives a message asking about the damages that he might have after the storm. Pete heads outside to look around. He notices that his trees are battered but will recover. He notices that the screened in portion of his deck has damage to two-sides of the screening. He notes that using a phone app. But that's about all that he can see. He does notice a large amount of dark 'sand' coming out of his downspouts and it is all over his driveway. He thinks that his roof needs some attention and notes that on his phone using the app as well.

Time: 6 pm—MDT

Location: Highlands Ranch, Colo., 456 Business Way—offices of ABC Ins. Co. Agent Al Al has been monitoring the storm as well as the messages between the ABC Insurance Company and his client policy holders. He notes Pete's response to damage assessment and puts a note into the system asking Pete if he wants an adjustor to come by and take a look.

Time: 6 pm—MDT

Location: Highlands Ranch, Colo., 123 Wild Horse Lane
Pete receives a text message from his agent, Al, asking about the damages that he might have after the storm and wants to know if Pete needs an adjustor to come take a look at his roof. Pete replies that he does indeed want someone to come take a look.
Time: 6 pm—MDT
Location: Denver, Colo., 789 Anderson St.
Adam, a preferred adjustor service provider for ABC Ins. Co., has been monitoring the storm as well. He has been reviewing the adjustor requests and tagging those that he feels that he can cover. He notes that a policy holder, Pete, has requested that an adjustor come by to take a look at his roof. Adam tags Pete's request and a message is sent to Pete asking for scheduling options.
Time: 7 pm—MDT
Location: Highlands Ranch, Colo., 123 Wild Horse Lane
Pete receives a text message from an adjustor, Adam, offering to come by to look at the roof, and offering a list of times that he is available. Via the phone app, Pete selects 2 pm the following day.
Time: 7 pm—MDT
Location: Denver, Colo., 789 Anderson St.
Adam receives Pete's schedule request and confirms that via the web portal tools.
Scene 2
Next Day—Tuesday
Time: 2 pm—MDT
Location: Highlands Ranch, Colo., 123 Wild Horse Lane
Adam arrives at Pete's house, and meets Pete. Adam begins touring the property, making his notes, taking pictures and video via a tablet application. Upon completion of his inspection, Adam meets with Pete and tells him that his 10 year old roof has received significant damage and is recommending a replacement roof He tells Pete to confer with his agent, Al, to determine their next steps.
Time: 3 pm—MDT
Location: Highlands Ranch, Colo., 456 Business Way—offices of ABC Ins. Co. Agent Al
Al has been reviewing his policy holder client's damage assessments and the adjustor notes and recommendations. He notices that Pete's assessment is completed and gives Pete a call.
In talking with Pete, they review his claim history, the out of pocket expenses for Pete if he decided to make a claim for the roof and his policy costs going forward. Pete decides that he wants to file a claim and Al agrees.
Time: 4 pm—MDT
Location: Highlands Ranch, Colo., 123 Wild Horse Lane
Pete has just gotten off of the phone with his agent, Al, and has decided to file a claim. He logs onto the WECARE website, into his account, and fills out the claim request. A request for roofing quotes is automatically sent out to the preferred roofers in Pete's area.
Time: 5 pm—MDT
Location: Denver, Colo., 1122 Rocky Road Ave
Randy, a preferred roofer for ABC Ins. Co., has been monitoring the storm messaging via his WECARE web portal tools. He notices that a request for a roofing quote has come in for his area. Randy tags Pete's request and a message is sent to Pete asking for scheduling options.
Time: 6 pm—MDT
Location: Highlands Ranch, Colo., 123 Wild Horse Lane
Pete receives a text message from a roofer, Randy, offering to come by to look at the roof, and offering a list of times that he is available. Via the phone app, Pete selects 2 pm the following day.
Time: 7 pm—MDT
Location: Denver, Colo., 789 Anderson St.
Randy receives Pete's schedule request and confirms that via the WECARE web portal tools.
Scene 3
Next Day—Wednesday
Time: 2 pm—MDT
Location: Highlands Ranch, Colo., 123 Wild Horse Lane
Randy arrives at Pete's house, and meets Pete. Randy begins inspecting the roof and making his notes, taking pictures and video via the tablet application. Upon completion of his inspection, Randy meets with Pete and tells him that his quote is for $10,000. He tells Pete to confer with his agent, Al, to determine their next steps.
Time: 3 pm—MDT
Location: Highlands Ranch, Colo., 456 Business Way—offices of ABC Ins. Co. Agent Al
Al has been reviewing his policy holder client's damage assessments, the adjustor notes and recommendations, and the roofer's notes, comments, and quote. He decides to give Pete a call.
Time: 4 pm—MDT
Location: Highlands Ranch, Colo., 123 Wild Horse Lane
Pete has just gotten off of the phone with his agent, Al, and they have agreed to the roofing quote from Randy. He logs on to the WECARE website, into his account, and verifies that he accepts Randy's quote. A work order and payment authorization are then automatically sent out to Randy.
Time: 5 pm—MDT
Location: Denver, Colo., 1122 Rocky Road Ave
Randy, a preferred roofer for ABC Ins. Co., has been reviewing his quotes and their statuses via his WECARE web portal tools. He notices that a roofing quote has been accepted. Randy flags Pete's quote and a message is sent to Pete asking for scheduling options.
Time: 6 pm—MDT
Location: Highlands Ranch, Colo., 123 Wild Horse Lane
Pete receives a text message from the roofer, Randy, confirming that he is going to work on Pete's roof, and offering a schedule of start dates. Via the phone app, Pete selects tomorrow, Thursday.
Time: 7 pm—MDT
Location: Denver, Colo., 789 Anderson St.
Randy receives Pete's schedule request and confirms that via the web portal tools. He confirms his schedule, and sends Pete a note with timeline for the roof repair job.
Scene 4
Next Day—Thursday
Time: 8 am—MDT
Location: Highlands Ranch, Colo., 123 Wild Horse Lane
Randy arrives with his roofing crew to begin the roof repair. He has scheduled two full days for the old roof removal and the new roof installation. His crew begins the task. Randy, using his tablet app, logs the project status.
Time: 8 am—MDT
Location: Highlands Ranch, Colo., 123 Wild Horse Lane
Pete is headed out the door to work when Randy arrives, he waves and drives to work. When he gets to his office, using the phone app, he logs the project status.
Time: 5 pm—MDT
Location: Highlands Ranch, Colo., 123 Wild Horse Lane Randy and his crew have successfully removed the old roof, and have stage the materials for the installation of the new roof for the following day. Randy, using his tablet app, logs the project status.

Time: 6 pm—MDT

Location: Highlands Ranch, Colo., 123 Wild Horse Lane

Pete arrives home from baseball practice and surveys the day's work that Randy and his crew have accomplished, then using the phone app, he logs the project status.

Scene 5

Next Day—Friday

Time: 8 am—MDT

Location: Highlands Ranch, Colo., 123 Wild Horse Lane

Randy again arrives with his roofing crew to complete the roof repair. He has schedule two full days for the old roof removal and the new roof installation. His crew begins the task. Randy, using his tablet app, logs the project status.

Time: 10 am—MDT

Location: Highlands Ranch, Colo., 123 Wild Horse Lane

Pete had left prior to Randy and his crew arriving, so using the WECARE phone app, he logs to check on the project status.

Time: 5 pm—MDT

Location: Highlands Ranch, Colo., 123 Wild Horse Lane

Randy and his crew have successfully installed the new roof, and have completed their cleanup. Randy performs his final inspection, making his notes, taking pictures and video via the tablet application. He logs the project as completed.

Time: 6 pm—MDT

Location: Highlands Ranch, Colo., 123 Wild Horse Lane

Pete arrives home from baseball practice and surveys the competed roof. Then, using the phone app, he logs the project status. He gives a tentative approval for the job completion.

Scene 6

Next Week—Monday

Time: 8 am—MDT

Location: Highlands Ranch, Colo., 456 Business Way—offices of ABC Ins. Co. Agent Al Al has been reviewing the project completed lists and notes that Pete's roof has been completed. He also notes that Pete has given tentative acceptance for the roof. He flags Pete's claim for a final approval visit and a message is sent to Pete providing scheduling options.

Time: 11 am—MDT

Location: Highlands Ranch, Colo., 123 Wild Horse Lane

Pete receives a text message from his agent, Al, offering a schedule of dates to perform the final approval visit. Via the phone app, Pete selects tomorrow, Tuesday.

Scene 7

Next Day—Tuesday

Time: 10 am—MDT

Location: Highlands Ranch, Colo., 123 Wild Horse Lane

Al arrives at Pete's house, and meets Pete. Al and Pete begin inspecting the roof, with Al making notes, taking pictures and video via the tablet application. Upon completion of the inspection Al and Pete agree to give final approval. Al logs his approval again with his tablet app, and Pete logs his approval with his phone app.

Time: Noon—CDT, 11 am—MDT

Location: ABC Insurance Company—WECARE Monitoring Dept.

The system logs the approval from both Al and Pete, final payment authorization is given to pay Randy. The system also logs the approval rating from both Al and Pete in regards to Randy and his crew's performance. The claim is closed.

Time: 5 pm—MDT

Location: Denver, Colo., 1122 Rocky Road Ave

Randy, after another long day, logs into his portal and sees a notice of payment for the roof on Pete's house.

To provide further clarity to the Detailed Description provided herein, the following list of components and associated numbering are provided as follows:

| No. | Component |
|---|---|
| 1000 | System |
| 1050 | System Hub |
| 2000 | Surveillance and Monitoring Module (SMM) |
| 2010 | SMM State Sensor Ingest Module |
| 2020 | SMM Risk of Peril Module |
| 2030 | SMM User Interface |
| 2040 | SMM Static Data Module |
| 2050 | SMM Computer Processor & Computer Memory |
| 2101 | SMM Risk Monitoring |
| 2102 | SMM Risk Assessment |
| 2103 | SMM Risk Notification |
| 3000 | Action Assessment Module (AAM) |
| 3010 | AAM Data Ingest Module |
| 3020 | AAM Damage Assessment Module |
| 3030 | AAM User Interface |
| 3040 | AAM Static Data |
| 3050 | AAM Computer Processor & Computer Memory |
| 3060 | AAM Determine Action(s) to Execute Module |
| 3201 | AAM Potential Damage Notification Management |
| 3202 | AAM Potential Damage Assessment |
| 3204 | AAM Proprietary Data Bookmark |
| 3302 | AAM Initial Damage Assessment |
| 3305 | AAM Actual Damage Assessment Management |
| 4000 | Action Execution Module (AEM) |
| 4011 | AEM Data Receive |
| 4012 | AEM Combine Data |
| 4017 | AEM Identify Temporal State of Peril |
| 4018 | AEM Identify Actors and Allocate Actions |
| 4040 | AEM Static Data |
| 5000 | Actors and Actors' Actions (AAA) |
| 5010 | Actors |
| 5011 | Policyholder (PH) |
| 5012 | Claim Center (CC) |
| 5013 | Re-insurer (RI) |
| 5014 | Agent |
| 5015 | Mitigation Responder (MR) |
| 5016 | Adjuster |
| 5017 | Repair Contractor (RC) |
| 5100 | Temporal State of Peril: Before |
| 5110 | Gold-Plan Sign-up |
| 5120 | Risk Notification Response |
| 5130 | Risk Notification Approval Management |
| 5140 | Preferred Status |
| 5150 | Create Account |
| 5160 | Account Maintenance and Monitoring |
| 5200 | Temporal State of Peril: During |
| 5210 | Potential Damage Mitigation Response |
| 5220 | Potential Damage Mitigation Activities |
| 5230 | Proprietary Data Bookmark |
| 5240 | Potential Damage Notification |
| 5250 | Potential Damage Notification Management |
| 5260 | Potential Damage Assessment |
| 5270 | Potential Damage Mitigation Management |
| 5300 | Temporal State of Peril: After |
| 5310 | Damage Notification Response |
| 5315 | Initial Damage Assessment |
| 5320 | Initial Damage Mitigation Activities |
| 5325 | Claim Filing |
| 5330 | Actual Damage Assessment Response |
| 5335 | Damage Repair Monitoring |
| 5340 | Repairs Acceptance |
| 5345 | Preferred Vendor Performance Review |
| 5350 | Claim Resolution Performance Review |
| 5355 | Damage Notification Management |
| 5360 | Initial Damage Mitigation Management |

-continued

| No. | Component |
|---|---|
| 5365 | Claims Management |
| 5370 | Actual Damage Assessment Management |
| 5375 | Damage Repair Management |
| 5380 | Claims Close |
| 5385 | Preferred Service Provider Performance Review |
| 5390 | Damage Repair Sign-off |
| 6000 | State Sensors |
| 6018 | Identify Required Actors and Allocate Required Actors' Actions |
| 6221 | Policy Holder (PH) Notified and Acknowledged |
| 6223 | Phase II PH Activities |
| 6320 | Claim Center (CC) Notified and Acknowledged |
| 6324 | Claim Center Activities |
| 6329 | Phase I Claim Center Activities |
| 6421 | Agent Notified and Acknowledged |
| 6520 | Phase II MR Activities |
| 6521 | Mitigation Responder (MR) Notified and Acknowledged |
| 6531 | Phase I Mitigation Responder Activities |

While various embodiment of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A surveillance and content determining system comprising:
   a surveillance computer that receives pre-incident weather data regarding one or more weather events, the surveillance computer identifying, based on the weather data, one or more geographic damages zones which are forecast to receive an incident with at least quarter-inch sized hail;
   one or more sensors in communication over a network with the surveillance computer, the one or more sensors broadcasting to the surveillance computer at a pre-incident point in time positional data of at least one vehicular asset, the at least one vehicle asset comprising a vehicle covered under a policyholder's insurance policy;
   one or more surveillance cameras installed in a building structure and in communication over the network with the surveillance computer, the surveillance computer receiving from the one or more sensors the positional data of the at least one vehicular asset and automatically sending a trigger, based on the weather data, to the one or more surveillance cameras in communication with the surveillance computer, the trigger causing the one or more surveillance cameras to record specific surveillance of the content of the building structure to generate, at the pre-incident point in time, a visual record of the at least one vehicular asset; and
   the surveillance computer further comprising a processor that determines if additional data is required about the at least one vehicular asset, and when additional data is required, sending a notification to a cellular phone of a user.

2. A surveillance and content determining system as set forth in claim 1, wherein said one or more weather events include a tornado.

3. A surveillance and content determining system as set forth in claim 1, wherein said one or more weather events include a hurricane.

4. A surveillance and content determining system as set forth in claim 1, wherein said one or more weather events include sustained winds of greater than 29 mph.

5. A surveillance and content determining system as set forth in claim 1, wherein said one or more weather events include sustained winds of greater than 35 mph.

6. A surveillance and content determining system as set forth in claim 1, wherein said building structure comprises a covered location having a roof.

7. A surveillance and content determining system as set forth in claim 1, wherein said building structure comprises a garage.

8. A surveillance and content determining system as set forth in claim 1, wherein said building structure comprises a house.

9. A surveillance and content determining system as set forth in claim 1, wherein the at least one vehicular asset comprises more than one vehicle asset.

10. A surveillance and content determining system as set forth in claim 1, wherein said at least one vehicular asset comprises a car.

11. A surveillance and content determining system as set forth in claim 1, wherein said visual record comprises a picture taken on an iPhone.

12. A surveillance and content determining system as set forth in claim 1, wherein said visual record comprises a picture taken on a smart phone.

13. A surveillance and content determining system as set forth in claim 1, wherein said visual record comprises a pictorial representation of the at least one vehicular asset.

14. A surveillance and content determining system as set forth in claim 1, wherein said additional data comprises a risk assessment with respect to said at least one vehicular asset.

15. A surveillance and content determining system comprising:
   a surveillance computer that receives pre-incident weather data regarding one or more weather events, the surveillance computer identifying, based on the weather data, one or more geographic damages zones which are forecast to receive an incident with at least one of a quarter-inch sized hail, a tornado and a hurricane;

one or more sensors in communication over a network with the surveillance computer, the one or more sensors broadcasting to the surveillance computer at a pre-incident point in time positional data of an insured asset;

one or more surveillance cameras installed in a building structure and in communication over the network with the surveillance computer, the surveillance computer receiving from the one or more sensors the positional data of the an insured asset and automatically sending a trigger, based on the weather data, to the one or more surveillance cameras in communication with the surveillance computer, the trigger causing the one or more surveillance cameras to record specific surveillance of the content of the building structure to generate, at the pre-incident point in time, a visual record of the insured asset; and the surveillance computer further comprising a processor that determines if additional data is required about the insured asset, and when additional data is required, sending a notification to a cellular phone of a user.

16. A surveillance and content determining system as set forth in claim 11, wherein the insured asset comprises jewelry.

17. A surveillance and content determining system as set forth in claim 11, wherein said one or more surveillance cameras is provided in a safe, with said one or more surveillance cameras adapted to present a picture of the safe.

18. A surveillance and content determining system comprising:

a surveillance computer that receives pre-incident weather data regarding one or more weather events, the surveillance computer identifying, based on the weather data, one or more geographic damages zones which are forecast to receive an incident, said incident selected from the group consisting of a hurricane, ice storm, thunderstorm, high winds, tornado, storm surge, flood, tsunami, earthquake, hail storm, volcanic eruption, fire, dust storm and snowstorm;

one or more sensors in communication over a network with the surveillance computer, the one or more sensors broadcasting to the surveillance computer at a pre-incident point in time positional data of a vehicular asset;

one or more surveillance cameras installed in a building structure and in communication over the network with the surveillance computer, the surveillance computer receiving from the one or more sensors the positional data of the vehicular asset and automatically sending a trigger, based on the weather data, to the one or more surveillance cameras in communication with the surveillance computer, the trigger causing the one or more surveillance cameras to record specific surveillance of the content of the building structure to generate, at the pre-incident point in time, a visual record of the vehicular asset; and the surveillance computer further comprising a processor that determines if additional data is required about the vehicular asset, and when additional data is required, sending a notification to a cellular phone of a user.

19. A surveillance and content determining system as set forth in claim 18, wherein said building structure comprises a covered location having a roof.

20. A surveillance and content determining system as set forth in claim 18, wherein the vehicular asset comprises a vehicle covered under a policyholder's insurance policy.

* * * * *